(12) United States Patent
Trovinger

(10) Patent No.: US 8,863,656 B2
(45) Date of Patent: Oct. 21, 2014

(54) POWER JUICER

(76) Inventor: Rusell T. Trovinger, Lafayette, CA (US)

( * ) Notice: Subject to any disclaimer, the term of this patent is extended or adjusted under 35 U.S.C. 154(b) by 401 days.

(21) Appl. No.: 13/506,449

(22) Filed: Apr. 19, 2012

(65) Prior Publication Data

US 2012/0216687 A1    Aug. 30, 2012

Related U.S. Application Data

(63) Continuation-in-part of application No. 11/899,649, filed on Sep. 6, 2007, now Pat. No. 8,474,374.

(51) Int. Cl.
*A23N 1/02* (2006.01)
*B30B 9/12* (2006.01)
*A47J 43/06* (2006.01)
*A47J 19/00* (2006.01)

(52) U.S. Cl.
CPC .. *A23N 1/02* (2013.01); *A47J 19/00* (2013.01)
USPC ............ 99/513; 99/510; 241/260.1; 100/145; 100/117

(58) Field of Classification Search
USPC ............ 99/495, 509, 510, 513; 100/117, 145; 241/74, 260.1
See application file for complete search history.

(56) References Cited

U.S. PATENT DOCUMENTS

| | | | | |
|---|---|---|---|---|
| 6,394,377 | B1 * | 5/2002 | Kim et al. | 241/260.1 |
| 6,637,323 | B2 * | 10/2003 | Kim | 99/510 |
| 2007/0277682 | A1 * | 12/2007 | Wong | 99/495 |

* cited by examiner

*Primary Examiner* — Reginald L Alexander
(74) *Attorney, Agent, or Firm* — Dennis A. DeBoo; Audrey A. Millemann; Weintraub Tobin, et al.

(57) ABSTRACT

A power juicer comprised of a motor disposed within a housing and having an output shaft projecting away from the housing; at least two alternate cutters each individually detachably connectable to the output shaft; a plurality of alternate inserts wherein a selected one of the plurality of alternate inserts circumscribes a selected one of the at least two alternate cutters detachably connected to the output shaft; and a body circumscribing the selected one of the plurality of alternate inserts wherein the body and the selected one of the plurality of alternate inserts include openings for feeding food to the selected one of the at least two alternate cutters detachably connected to the output shaft and openings for receiving juice, homogenized food, or shredded food therefrom upon actuation of the motor under the control of a safety system.

20 Claims, 35 Drawing Sheets

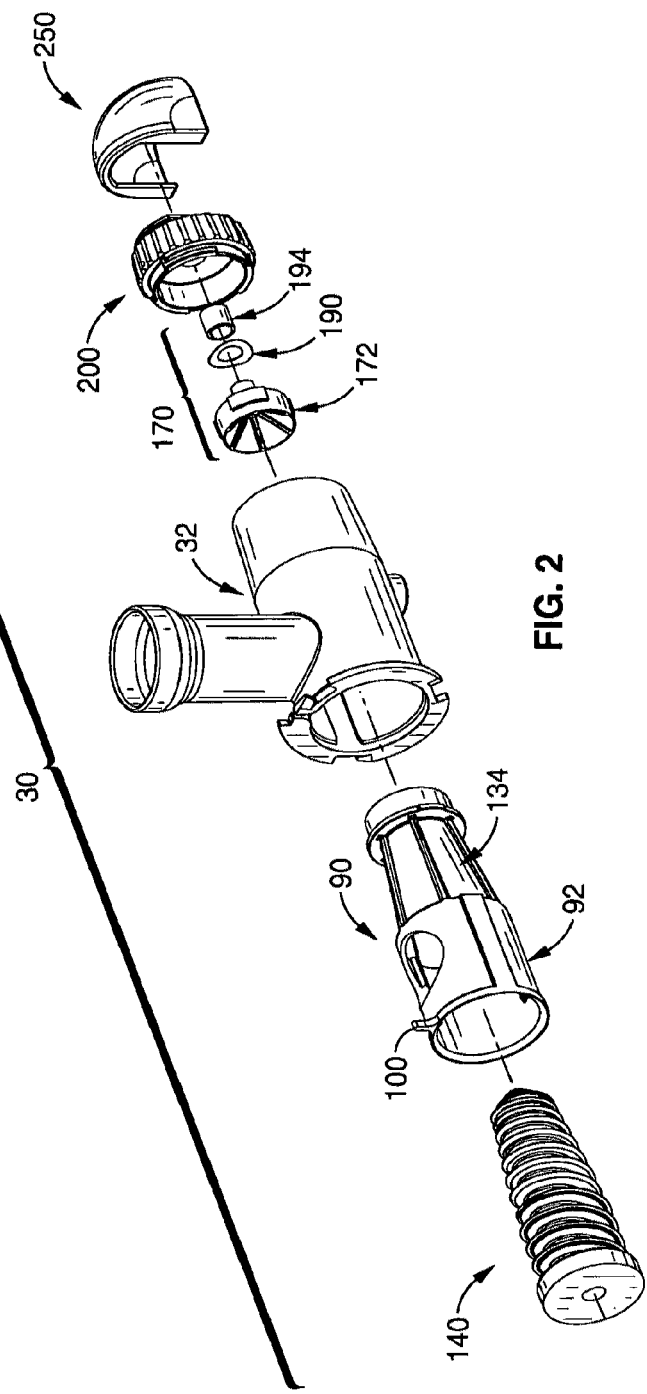

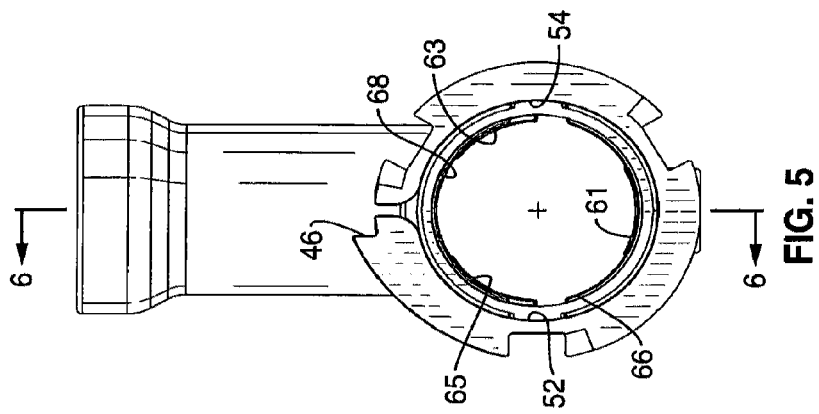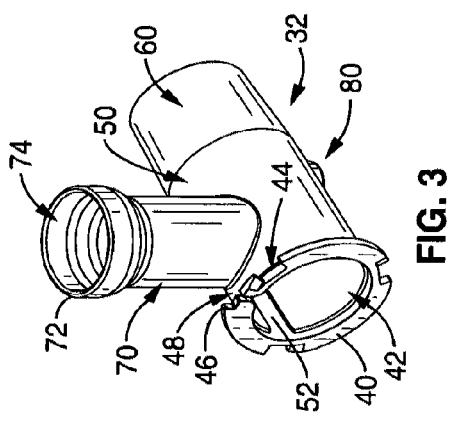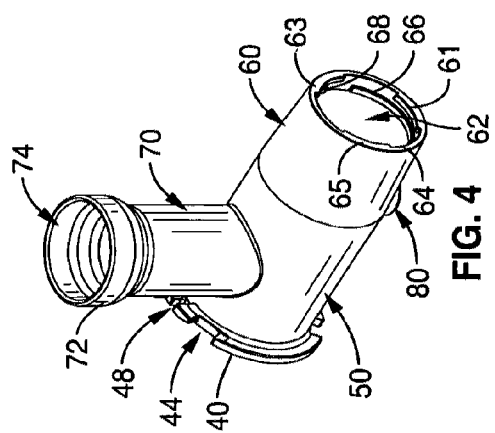

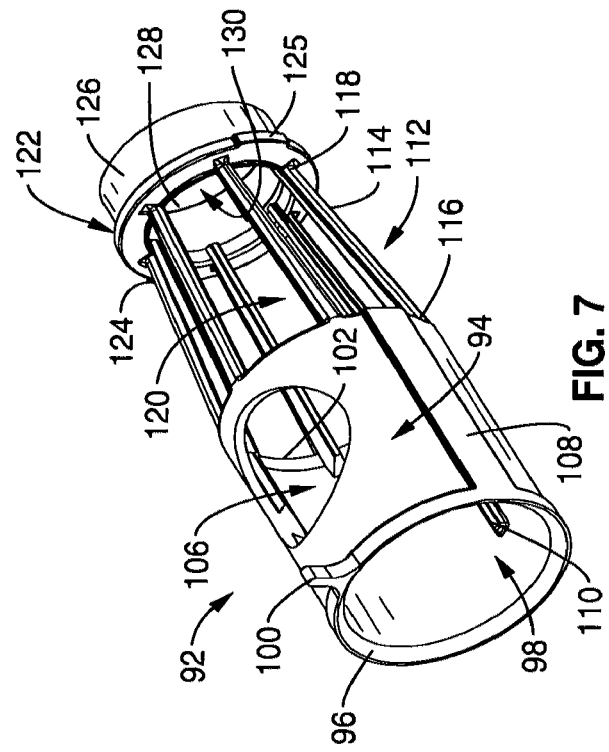
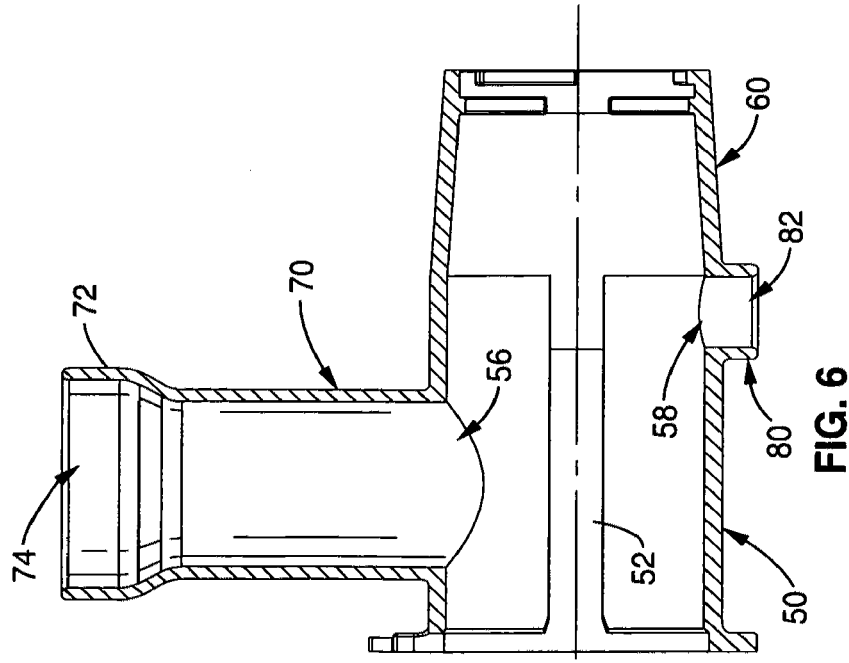

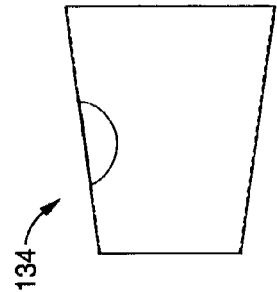
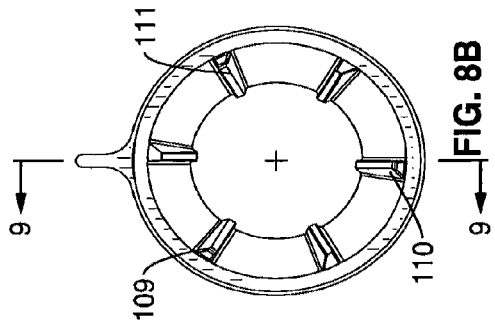
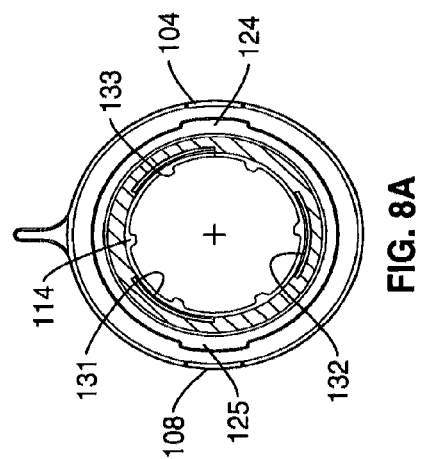
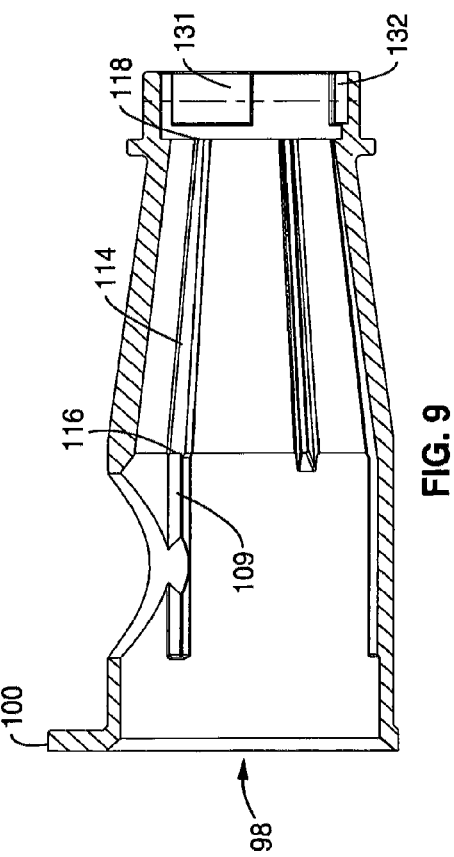

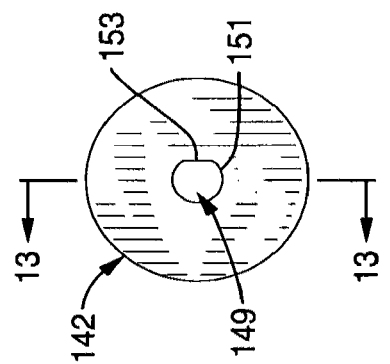
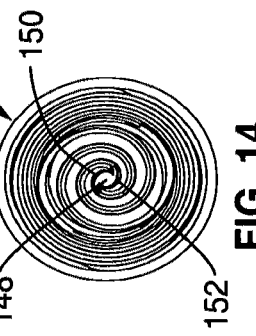
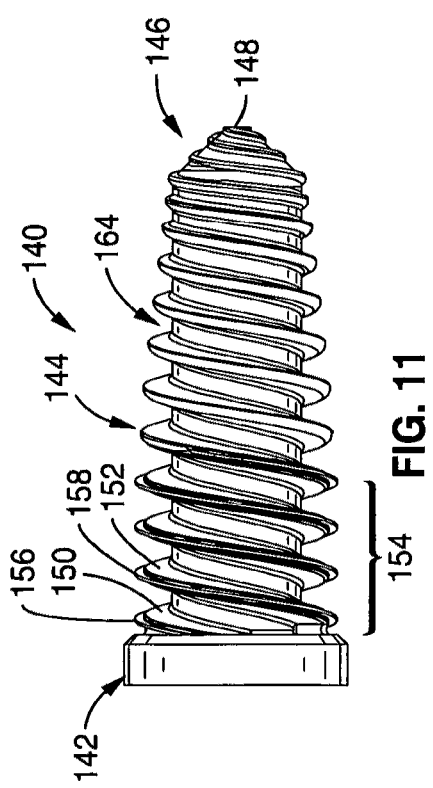
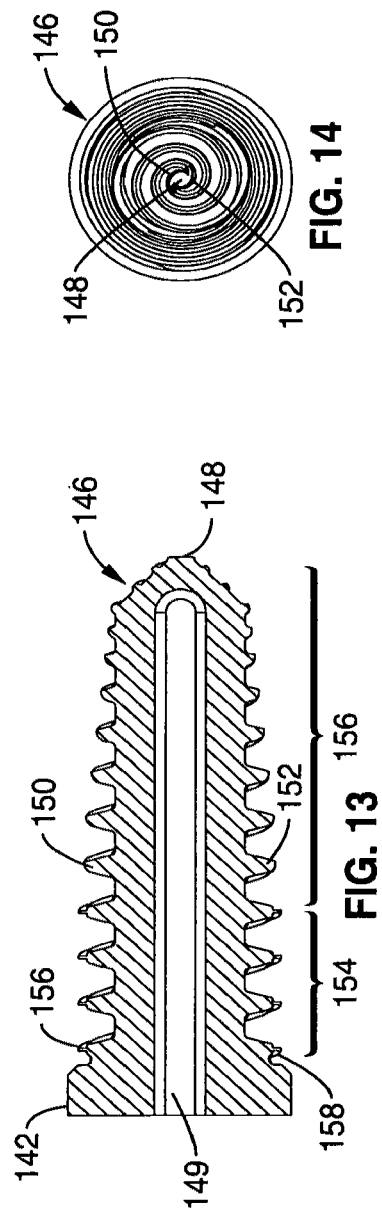

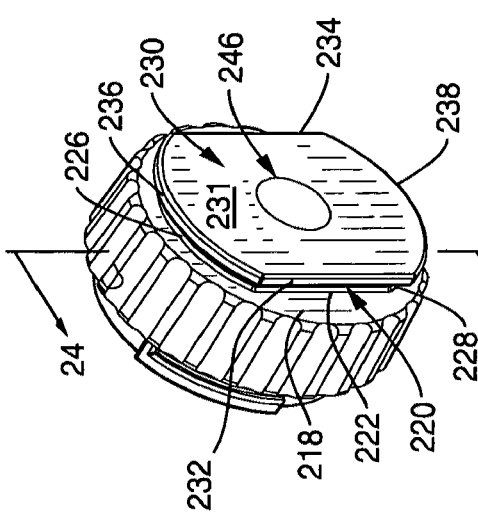
FIG. 23
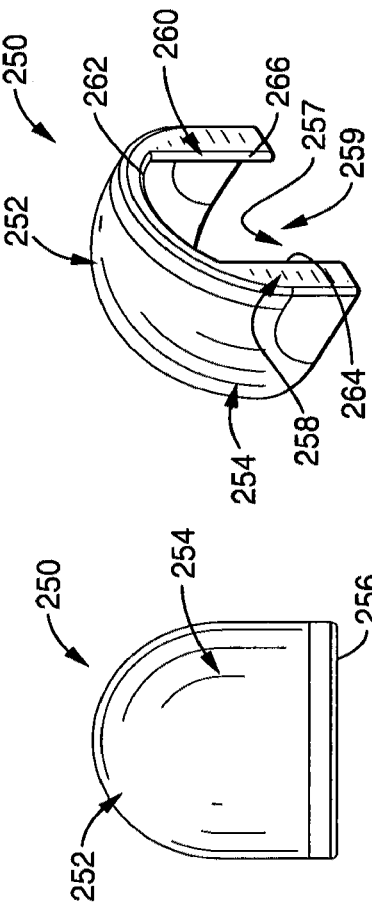
FIG. 26
FIG. 25
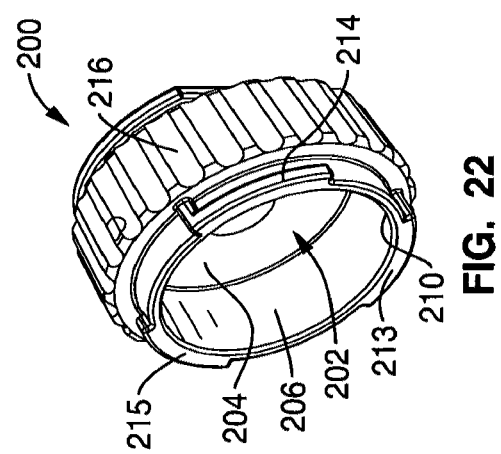
FIG. 22
FIG. 24

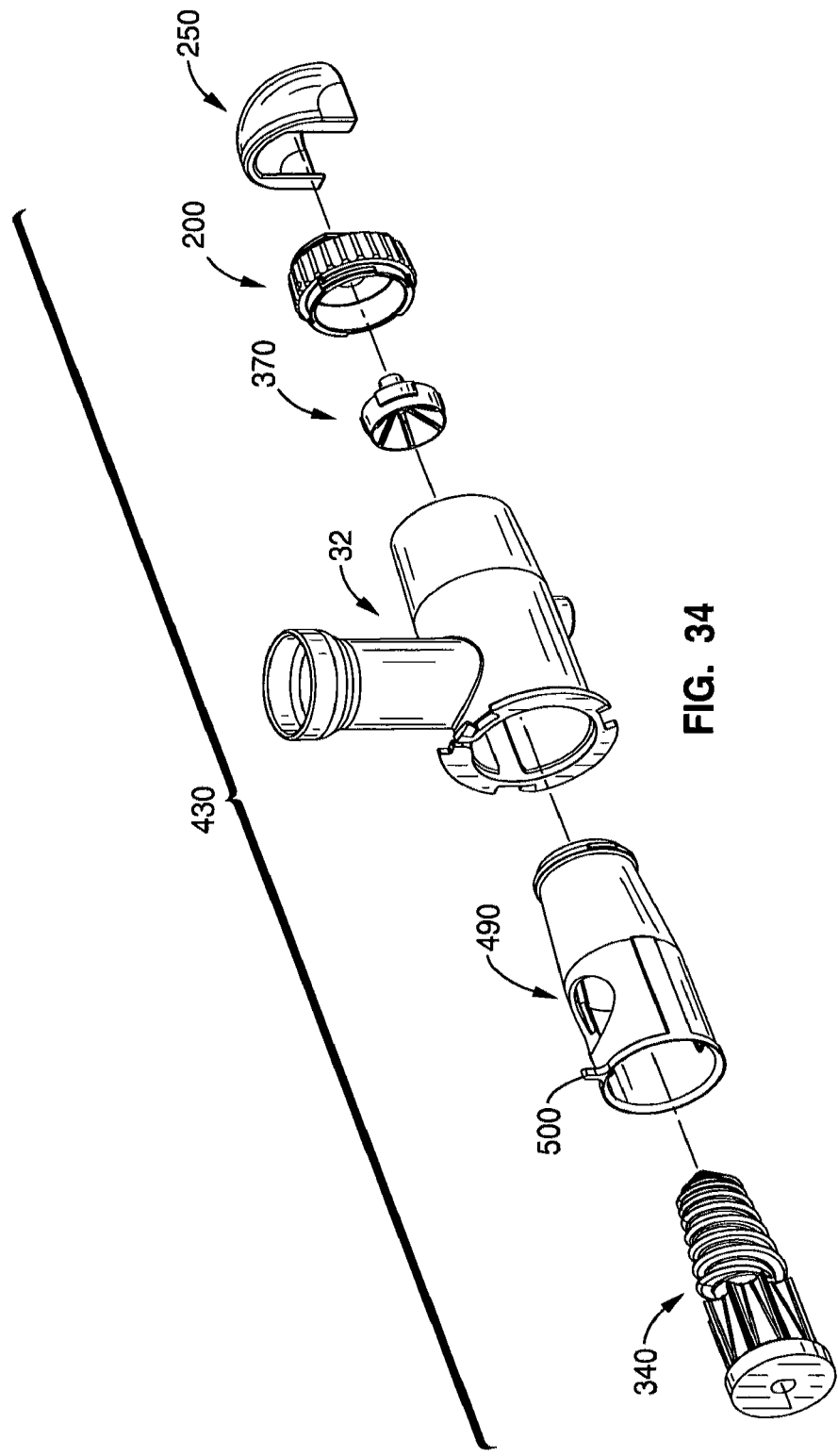

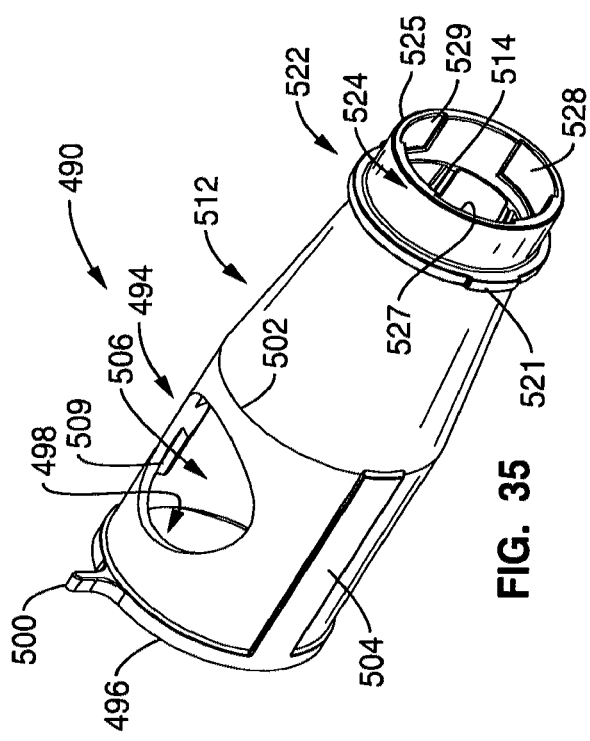
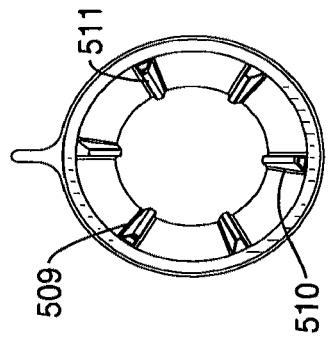
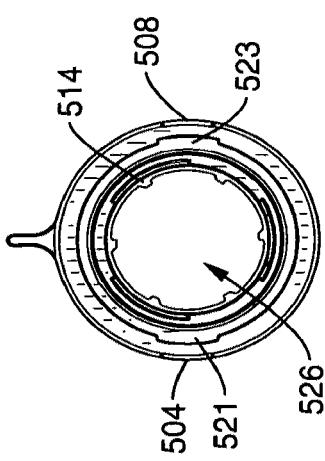
FIG. 35
FIG. 36A
FIG. 36B

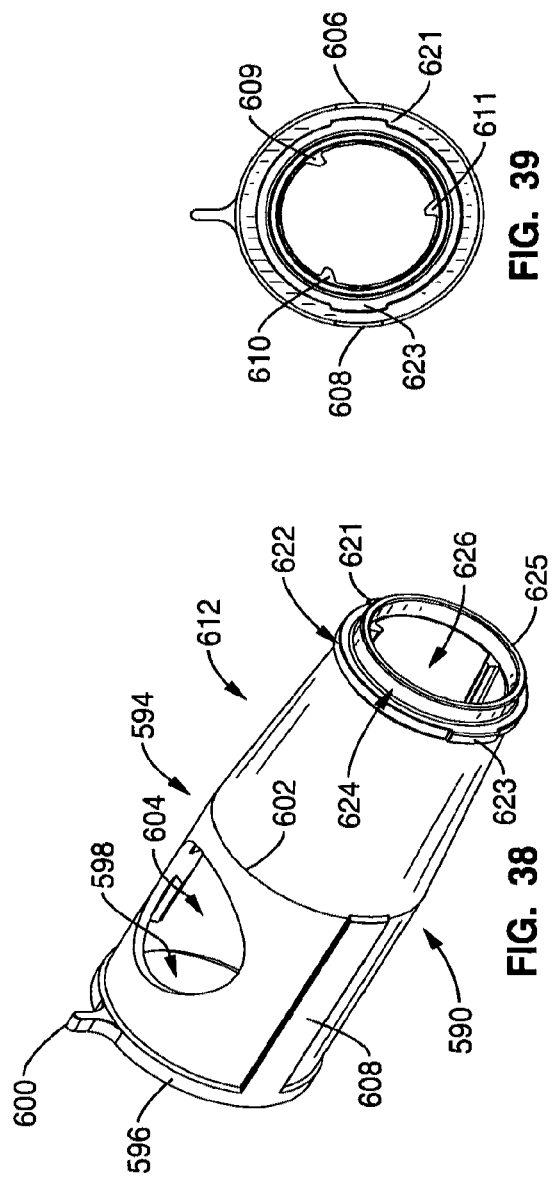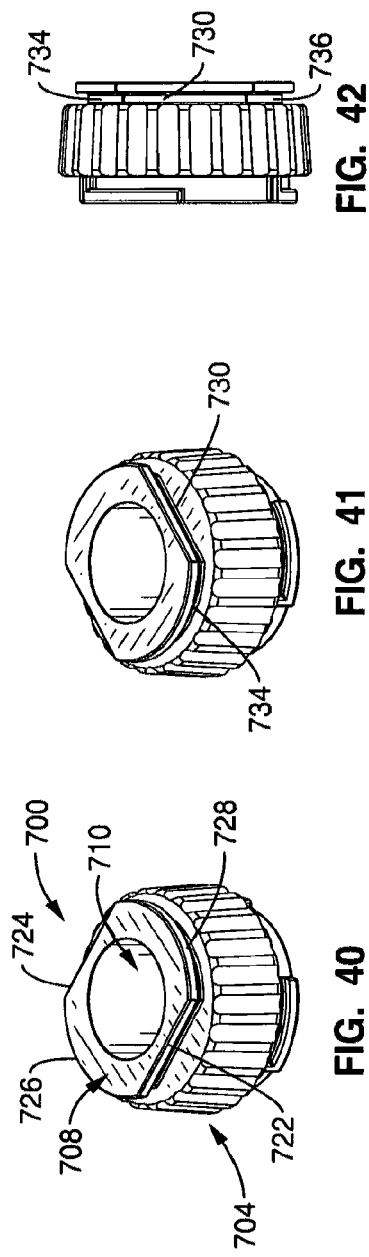

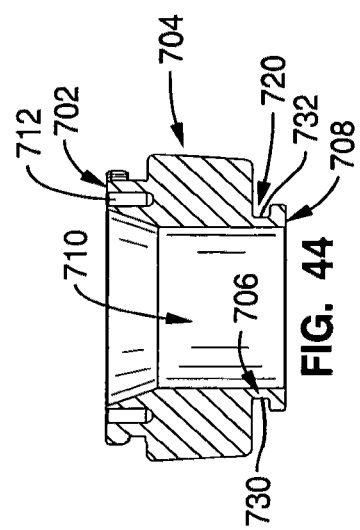
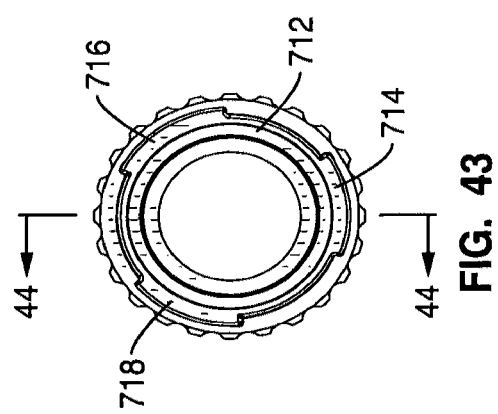

POWER JUICER

This application is a continuation-in-part patent application of U.S. patent application Ser. No. 11/899,649, filed Sep. 6, 2007 now U.S. Pat. No. 8,474,374, currently pending and which is hereby incorporated by reference herein in its entirety.

FIELD OF THE INVENTION

This invention relates generally to devices used to process vegetables and fruit and, in particular, to an electric vegetable and fruit juicer that has alternate cutters/augers that permit continuous juicing of wheatgrass and other soft greens, hard and soft vegetables, and fruits, as well as homogenizing and shredding.

BACKGROUND OF THE INVENTION

There are several different juicers currently available for the extraction of juice from vegetables or fruit. These devices are generally powered by an electric motor and employ filters to remove excess solids from the juice. Some allow for continuous juicing (automatic solids expulsion), while some do not and must be occasionally shut down for manual removal of accumulated solids.

There are two primary types of juicers: auger and masticating. The auger juicers typically operate at very low speeds, about 80-100 rpm. The auger tears or slices and then crushes the food during processing. Examples are described in U.S. Pat. No. 6,637,323 issued Oct. 28, 2003, to Kim; U.S. Pat. No. 6,394,377 issued May 28, 2002, to Kim, et al.; U.S. Pat. No. 5,906,154 issued May 25, 1999 to Yoon, et al.; U.S. Pat. No. 4,429,626 issued Feb. 7, 1984 to Ihara, et al.; and U.S. Pat. No. 4,385,553 issued May 31, 1983 to Ihara, et al. Some auger juicers utilize two augers at the same time. See U.S. Pat. No. 5,452,650 issued Sep. 26, 1995, to Lee and U.S. Pat. No. 5,381,730 issued Jan. 17, 1995, to Kim. These juicers are best suited for soft materials and greens. Because they rotate at a relatively low speed, they are cumbersome when juicing hard materials, such as carrots and beets. For some processes, such as homogenizing, these juicers are inadequate.

The masticating juicers typically operate at higher speeds than the auger juicers and use a cutter that grinds and chews the food. Centrifugal juicers, a type of masticating juicer, have a rotating, horizontal grating disk, and operate at about 3600 rpm. U.S. Pat. No. 4,643,085 issued Feb. 17, 1987 to Bertocchi and U.S. Pat. No. 6,050,180 issued Apr. 18, 2000 to Moline describe examples of centrifugal juicers. Centrifugal juicers are best suited for juicing of vegetables and fruit. They cannot juice greens such as wheatgrass, mix, shred, or homogenize food to make sorbets, nut butters, soups, and other similar food products.

Another type of masticating juicer, the CHAMPION juicer (see U.S. Pat. No. 2,864,419 issued Dec. 16, 1958 to Woock; U.S. Pat. No. 3,976,001 issued Aug. 24, 1976 to Trovinger; and U.S. Pat. No. 5,806,413 issued Sep. 15, 1998 to Trovinger has a single cutter that has saw tooth blades at one end and an auger at the other end, which rotates at about 1,725 rpm. First, the blade part of the cutter grinds the food to be processed, to separate the juice from the solids. Next, a combination of centrifugal force, compression, and gravity are used to expel the juice out the bottom of the housing. Then, the auger part of the cutter forces the solids forward and out the front of the housing. This juicer does not effectively juice greens for two reasons: first, wheatgrass wraps and collects around the cutter blades, and, second, solids compression is not sufficient for efficient extraction of juice.

Thus, there is a need for a single juicer that overcomes the significant shortcomings of the known prior-art as delineated hereinabove.

BRIEF SUMMARY OF THE INVENTION

Accordingly, and in one aspect, an embodiment of the invention provides a power juicer that can easily, quickly, and efficiently juice both soft materials, like greens, and hard materials, like vegetables, as well as fruit. Additionally, an embodiment of the invention provides a power juicer that has more than one speed, so that the processing of all materials is effectively optimized. Furthermore, an embodiment of the invention provides a power juicer that performs a variety of processes in addition to juicing, such as shredding and homogenizing, to allow the preparation of sorbets, soups, nut butters, and other foods.

In particular, an embodiment of the invention provides an all-purpose power juicer that has two removable, alternate cutters/augers: a greens cutter/auger and a grinding cutter/auger. The greens auger is used for the juicing of wheatgrass and greens, soft vegetables, and fruits, and for coarse shredding. In one embodiment, this auger utilizes a rear auger portion to chop the food into small pieces and a front auger portion to move the chopped food forward. Additionally, and in one embodiment, the rear auger portion has a missing lead and dimples on the front side of each remaining lead to promote better feeding of the material during operations. The grinding cutter/auger is used for hard vegetable juicing, homogenizing, and fine shredding. This cutter/auger utilizes a saw toothed cutting portion to grind the food into small pieces and an auger portion to move the ground food forward. Both the greens cutter/auger and the grinding cutter/auger have a spiral auger nose which promotes total self-expulsion of food solids during juicing to minimize heat build-up in the juice. This permits a cutter speed for wheatgrass juicing that is over four times to over twenty times higher, and for hard vegetable juicing that is over twenty times higher, than the speeds of existing juicers, resulting in a much quicker juicing process.

Furthermore, and in one embodiment, the power juicer includes a body; a set of three removable, alternate cylindrical body inserts for juicing, homogenizing, or shredding that slide into the body; two alternate restrictors; a restrictor nut and a shredder nut; an optional deflector; an electric motor with a motor shaft; and a safety system for safely energizing the electric motor; and a tamper to assists in forcing foods to the cutter.

Hence, in one aspect, an embodiment of the invention provides a juicer that is advantageous in that it can be used for juicing soft materials, including greens and soft vegetables, and for juicing hard materials, such as hard vegetables, in addition to fruit, in a fast and efficient manner. In another aspect, an embodiment of the invention provides a juicer that is advantageous in that it has multiple speeds, which permit the optimization of all processes. In yet another aspect, an embodiment of the invention provides a juicer that is advantageous in that, in addition to juicing, it can be used for a variety of different processes, including homogenizing, mixing, and coarse or fine shredding, so that sorbets, soups, nut butters, and other similar foods can be prepared. In a further aspect, an embodiment of the invention provides a juicer that is advantageous in that it is more efficient than existing juicers and produces an increased amount of juice.

Accordingly, it should be apparent that numerous modifications and adaptations may be resorted to without departing from the scope and fair meaning of the claims as set forth hereinbelow following the detailed description of the invention.

BRIEF DESCRIPTION OF THE DRAWINGS

FIG. 2 is an exploded parts perspective view of a greens juicing configuration.

FIG. 3 is a back and side perspective view of a main body.

FIG. 4 is a front and side perspective view of the main body illustrated in FIG. 3.

FIG. 5 is a rear plan view of the main body illustrated in FIG. 3.

FIG. 6 is a sectional view of the main body taken along line 6-6 of FIG. 5.

FIG. 7 is a rear and side perspective view of an insert member of a screen insert.

FIG. 8A is a front plan view of the insert member illustrated in FIG. 7.

FIG. 8B is a back plan view of the insert member illustrated in FIG. 7.

FIG. 9 is a sectional view of the insert member shown in FIG. 7. taken along line 9-9 of FIG. 8B.

FIG. 10 is a side plan view of an embodiment of a screen cone of an embodiment of a screen insert.

FIG. 11 is a side plan view of a greens cutter or auger.

FIG. 12 is a rear plan view of the greens cutter or auger illustrated in FIG. 11.

FIG. 13 is a sectional view of the greens cutter or auger taken along line 13-13 of FIG. 12.

FIG. 14 is a front plan view of the greens cutter or auger illustrated in FIG. 11.

FIG. 22 is a rear and side perspective view of a restrictor nut.

FIG. 23 is a side and front perspective view of the restrictor nut shown in FIG. 22.

FIG. 24 is a sectional view of the restrictor nut taken along line 24-24 of FIG. 23.

FIG. 25 is a front plan view of an embodiment of a deflector.

FIG. 26 is a side and rear perspective view of the deflector illustrated in FIG. 25.

FIG. 34 is an exploded parts perspective view of an embodiment of a homogenizing configuration.

FIG. 35 is a side and front perspective view of an embodiment of a homogenizing insert.

FIG. 36A is a front plan view of the homogenizing insert illustrated in FIG. 35.

FIG. 36B is a back plan view of the homogenizing insert illustrated in FIG. 35.

FIG. 38 is a side and front perspective view of an embodiment of a shredder insert.

FIG. 39 is a front plan view of the shredder insert illustrated in FIG. 38.

FIG. 40 is a side and front perspective view of a shredder nut.

FIG. 41 is another side and front perspective view of the shredder nut.

FIG. 42 is a plan side view of the shredder nut.

FIG. 43 is a back plan view of the shredder nut.

FIG. 44 is a sectional view of the shredder nut taken along line 44-44 of FIG. 43.

DETAILED DESCRIPTION OF THE INVENTION

Figure 1:
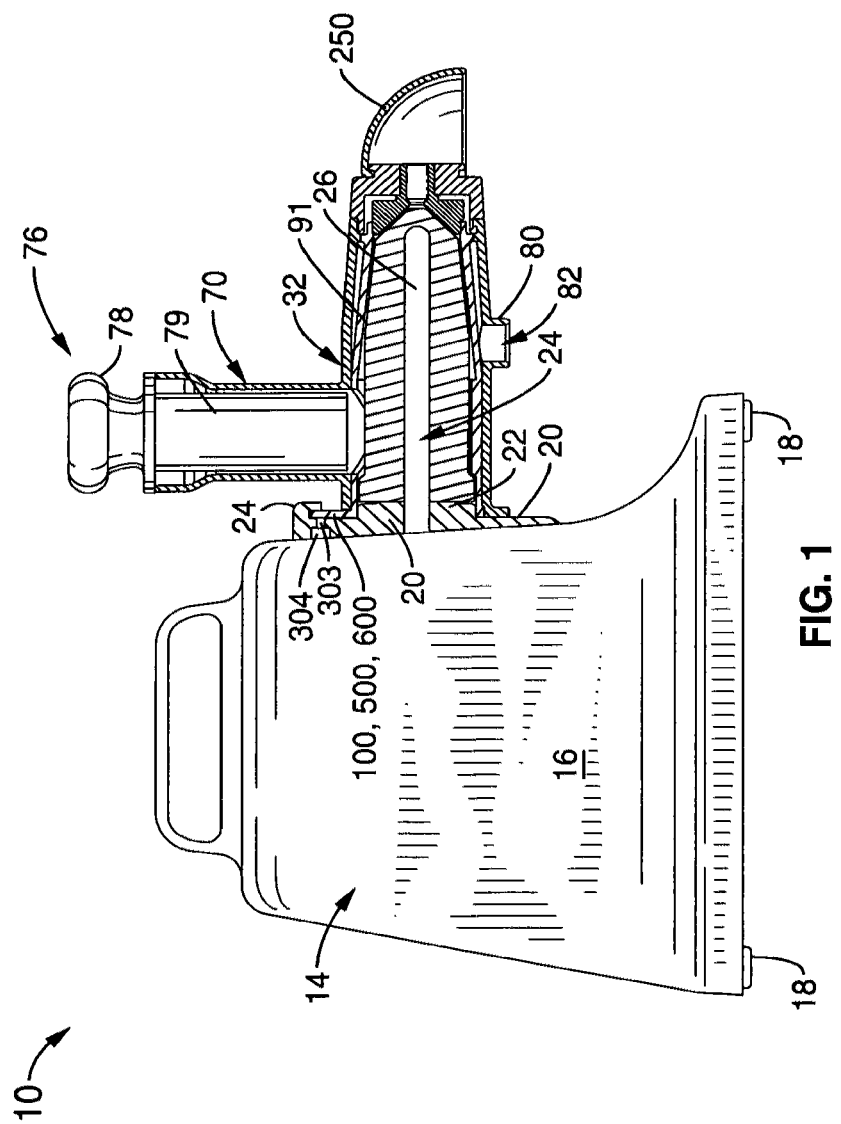
FIG. 1 is a side elevation view of an embodiment of a juicer with portions taken in section for clarity.

Considering the drawings, wherein like reference numerals denote like parts throughout the various drawing figures, reference numeral 10 is directed to a power juicer according to an embodiment of the present invention and reference numeral 1010 is directed to a power juicer according to another embodiment of the present invention.

Referring to FIG. 1, and in one embodiment, the juicer 10 is comprised of a horizontally disposed electrical motor 12 enclosed within a housing 14 which includes a base 16 supported on a surface via feet 18. The housing 14 is provided with a hub 20 that includes a shaft seal 22 to prevent contaminants escaping from or entering into electrical motor 12 from the external environment. A circular motor shaft 24 having a flat side 26 is driven by the electrical motor 12 and generally horizontally extends from motor 12, through both the hub 20 and shaft seal 22. In one embodiment, the motor shaft 24 is about three and one-half inches long and about one-half inch in diameter and protrudes about two inches beyond the face of hub 20.

The circular motor shaft 24 receives one of a plurality of different cutters 140 or 340 associated with one of a plurality of different configurations of components that allow the juicer 10 to be used for different purposes. In one embodiment, the motor shaft 24 has a machined flat about 0.05 inches in depth and about 1.9 inches in length as measured back from the tip, which corresponds to a blind bore disposed in each of the cutters 140, 340 for preventing slippage between cutters 140, 340 and motor shaft 24 as will be further delineated hereinbelow.

More specifically, and in one embodiment, the juicer 10 has four main different configurations of components: a greens juicing configuration 30, a vegetable juicing configuration 330, a homogenizing configuration 430, and a shredder configuration 530 for allowing the juicer 10 to be used for different purposes. The user can switch from one configuration to another by using a different arrangement of components and the components may be grouped differently by the user to create an alternative configuration that may serve a particular purpose.

Greens Juicing Configuration 30

FIG. 2 shows an exploded parts perspective view of the greens juicing configuration 30 of the juicer 10 for preferably juicing greens, such as wheatgrass or leafy materials, or for juicing fruits and soft vegetables. The greens juicing configuration 30 includes a main or juicer body 32 having an open back end 42 and an open front end 62, a screen insert 90 received through the open back end 42 of the main body 32 and extending through the open front end 62 thereof and having an open inner end 98 and an open outer end 130. The greens juicing configuration 30 further includes a greens cutter 140 having a rear keyed bore 149 received on the motor shaft 24 of the electrical motor 12. The greens cutter 140 is circumscribed by the screen insert 90 received within the main body 32 when the main body 32 is connected to hub 22. The greens juicing configuration 30 further includes a greens restrictor 170 received within the open outer end 130 of the screen insert 90 and a restrictor nut 200 receiving the greens restrictor 170 and coupling to the open front end 62 of main body 32. An optional deflector 250 operatively couples to restrictor nut 200.

Main Body 32

Referring to FIGS. 3 through 6, and in one embodiment, the main body 32 includes a rear annular flange 40 that defines an open back end 42 of the main body 32, a hollow cylindrical portion 50 integrally formed with and horizontally extending from the rear annular flange 40, and a hollow conical portion 60 integrally formed with and horizontally extending from the hollow cylindrical portion 50 and terminating to an open front end 62 of the main body 32. Additionally, the main body 32 includes an upwardly extending hollow feeding tube 70 and a downwardly extending abbreviated or short hollow outlet tube 80 both integrally formed with and in open communication with the hollow cylindrical portion 50. As shown in FIG. 6, the bottom surfaces of the hollow cylindrical portion 50 and the hollow conical portion 60 taper or funnel toward the downwardly extending abbreviated hollow outlet tube 80 to promote juice flow.

Rear Annular Flange 40

Rear annular flange 40 defines the open back end 42 of the main body 32 and includes a plurality of circumferentially spaced cut-out notches 44 for engaging over a plurality of circumferentially spaced in turned ears 24 integrally formed with hub 20. Additionally, the annular flange 40 includes a radially extending stop 46 for alignment engagement with the uppermost in turned ear of the plurality of in turned ears 24 (FIGS. 1 and 3) when the main body 32, with insert 90 received therein, is connected to the hub 20. Furthermore, the rear annular flange 40 includes an indentation 48 sized to receive a safety projection 100 on screen insert 90, safety projection 500 on homogenizing insert 490, and safety projection 600 on shredder insert 590 for engaging a microswitch push button 303 on a safety microswitch 304 as will be further delineated hereinbelow.

Hollow Cylindrical Portion 50

The hollow cylindrical portion 50 horizontally extends from the rear annular flange 40 and includes two interior diametrically opposed longitudinally extending channels 52, 54 that extend from the annular flange 40 to the hollow conical portion 60.

Hollow Conical Portion 60

The hollow conical portion 60 horizontally extends from the hollow cylindrical portion 50 to a circular front edge 64 defining the open front end 62 of the main body 32. The hollow conical portion 60 includes three inwardly projecting circumferentially spaced tabs 61, 63, and 65 extending from the interior surface of the hollow conical portion 60 immediately adjacent circular front edge 64 thereby defining three circumferentially spaced notches therebetween. Slightly further rearward from front edge 64, hollow conical portion 60 includes two partially circumferential ribs 66, 68 which define two diametrically opposed spacings therebetween.

In one embodiment, the open front end 62 of the main body 32 is slightly smaller in diameter than the open back end 42 of the main body 32. Additionally, the inside diameter of horizontally extending hollow cylindrical portion 50 is slightly larger than the corresponding outside diameter of screen insert 90. Furthermore, the horizontally extending hollow conical portion 60 is sized larger than the corresponding outside diameter of screen insert 90 such that a gap 91 (FIG. 1) is defined therebetween for allowing circumferential juice flow out of the screen insert 90 as further delineated hereinbelow.

Hollow Feeding Tube 70 and Tamper 76

Additionally, and in one embodiment, the hollow feeding tube 70 is integrally formed with and upwardly extends from the hollow cylindrical portion 50. The hollow feeding tube 70 is in open communication hollow cylindrical portion 50 via a top opening 56 (FIG. 6) disposed through a top of hollow cylindrical portion 50. The upwardly extending hollow feeding tube 70 extends from the top opening 56 in hollow cylindrical portion 50 and terminates to a top flange 72 defining a feed tube opening 74 for feeding the food into the juicer 10. In one embodiment, the diameter of the top flange 72 is larger than the diameter of the remaining portion of the feeding tube 70 and slightly narrower than the open front end 62 of the main body 32.

As shown in FIG. 1, and in one embodiment, a tamper 76 is employed to assist in forcing the foods to the cutters 140 and 340 by pulsing or moving the tamper 76 up and down. In one embodiment, the tamper 76 includes a head 78 surmounting a body 79 wherein the body 79 is sized to be received in the hollow feeding tube 70 and the head 78 is sized larger than the feed tube opening 74 so as not to drop the tamper 76 therethrough.

Abbreviated Hollow Outlet Tube 80

Furthermore, and in one embodiment, the abbreviated or very short hollow outlet tube 80 is integrally formed with the main body 32 and is in open communication therewith via a bottom opening 58 (FIG. 6) disposed through a bottom of main body 32. The abbreviated outlet tube 80 downwardly extends from the bottom opening 58 and terminates to a circular opening or juice outlet 82 for expelling the juice that is extracted from the food.

Screen Insert 90

Referring to FIGS. 2 and 7 through 10, and in one embodiment, screen insert 90 is comprised of an insert member 92 and a screen cone member 134 manufactured as a single, unitary piece by, for example, molding the screen cone member 134 into the insert member 92. Alternatively, the screen insert 90 can be manufactured as separate parts 92 and 134 that are non-removably attached to each other.

Insert Member 92

Referring to FIGS. 7 through 9, the insert member 92 is comprised of an open ended hollow rear cylindrical section 94 having a rear annular lip 96 defining a rear opening 98 of screen insert 90. The safety projection 100 radially extends from a top section of the rear annular lip 96 and the open ended hollow rear cylindrical section 94 transitions from the rear annular lip 96 to a front annular edge 102 defining a front opening of the rear cylindrical section 94.

An opening 106 is formed through the top of the rear cylindrical section 94 and is in open communication with the upwardly extending hollow feeding tube 70 via the top opening 56 of cylindrical portion 50 when the screen insert 90 properly mates with main body 32. Additionally, the rear cylindrical section 94 includes two exterior longitudinally extending tabs 104, 108 disposed on opposite sides of the rear cylindrical section 94. The two exterior longitudinally extending tabs 104, 108 that correspond to and mate with the two interior diametrically opposed longitudinally extending channels 52, 54 of the hollow cylindrical portion 50. Furthermore, the rear cylindrical section 94 includes three interior spaced apart longitudinally extending ribs 109, 110, and 111 which rearwardly extend from the front annular edge 102 of the rear cylindrical section 94 and terminate prior to reaching the rear opening 98 of the rear cylindrical section 94.

The insert member 92 is further comprised of a front conical section 112 defined by a plurality of spaced apart ribs 114 having rear ends 116 and front ends 118. In one embodiment, there are six spaced apart ribs 114 with every other one of the ribs 114 being continuous with one of the longitudinally extending ribs 109, 110, and 111 disposed within the interior of rear cylindrical section 94. The plurality of spaced apart ribs 114 define windows 120 therebetween and taper forwardly from rear ends 116 to front ends 118.

At front ends 118, the plurality of spaced apart ribs 114 transition into an annular collar 122. The annular collar 122 radially outwardly extends from the front ends 118 of the plurality of spaced apart ribs 114 and includes two diametrically opposed exterior tabs 124, 125 radially extending therefrom for mating with the two diametrically opposed spacings between the two partially circumferential ribs 66, 68 disposed within the interior of the main body 32.

The annular collar 122 forwardly steps down and transitions into a hollow annular rim 126 which extends through the open front end 62 of the main body 32 and terminates to a front circular edge 128 defining a front opening 130 for the expulsion of solids such as pulp, homogenized, or shredded material. Three spaced apart notches 131, 132, and 133 are disposed on an interior surface of the annular rim 126 and rearwardly extend from the front circular edge 128 for receiving three complementarily shaped tabs 187, 188, and 189 disposed on an exterior surface of a restrictor body 172 of greens restrictor 170 further delineated hereinbelow.

Screen Cone Member 134

Referring to FIG. 10, the screen insert 90 further includes the open ended screen cone member 134 which is formed with or fitted into the front conical section 112 of insert member 92 for closing the windows 120 formed by the plurality of spaced apart ribs 114. Additionally, and in one embodiment, the screen cone member 134 is an open ended, screen sided conical cone made of stainless steel. Furthermore, the screen insert 90 can be manufactured in two pieces by, for example, molding the rear cylindrical section 94 as a first piece and the front conical section 112 with the screen cone member 134 as a second piece.

Greens Cutter 140

Referring to FIGS. 2 and 11 through 14, and in one embodiment, the greens juicing configuration 30 is further comprised of the greens cutter 140 which is sized to fit inside screen insert 90 or inside the shredder insert 590. In one embodiment, the greens cutter 140 includes a circular rear base 142 transitioning into an elongated body or member 144 terminating to a tapered nose 146 having a flat tip 148. A blind bore 149 extends through the base forming a circular opening 151 with a flat side 153 and extends through the elongated body 144 up to the nose 146, but not through nose 146 as shown in FIG. 13. The blind bore 149 with flat side 153 are sized and shaped to accommodate motor shaft 24 with flat side 26.

In one embodiment, the greens cutter 140 also includes two projecting helical ribs 150, 152 having opposing back ends which are spaced apart about one hundred eighty degrees apart and which start from circular rear base 142 and terminate to front ends at the flat tip 148 of the nose 146. The greens cutter 140 further includes a cutting portion 154 and an auger portion 162. The cutting portion 154 extends from circular rear base 142 to auger portion 162 and is about one-third the total length of greens cutter 140. Cutting portion 154 includes at least one spiral cutting blade 156 and preferably two spiral cutting blades 156, 158 having opposing first ends which are spaced apart about one hundred eighty degrees apart and which start from circular rear base 142 and which run along the respective projecting helical ribs 150, 152 along the length of the cutting portion 154 and terminate to second ends. Blades 156, 158 are preferably made of stainless steel and can be molded with the respective projecting helical ribs 150, 152 along the cutting portion 154 or can take the place of the helical ribs 150, 152 along the cutting portion 154 and be integrally formed with the elongated body 144 of the greens cutter 140.

The spiral auger portion 162 is formed by the two projecting helical ribs 150, 152 extending from the second ends of the blades 156, 158 up to the flat tip 148 of the tapered nose 146. Spiral auger portion 162 tapers at its front end along tapered nose 146 forming a spiral auger nose which, in one embodiment, is tapered at about a 45 degree angle. Grooves 164 are defined between the two helical ribs 150, 152 and the width of the grooves 164 between the two helical ribs 150, 152 decreases towards tapered nose 146.

Greens Restrictor 170

Referring to FIGS. 2 and 15 through 18, the greens juicing configuration 30 is further comprised of the greens restrictor 170 which includes greens restrictor body 172, wave disc spring 190, and spring retainer 194. Greens restrictor body 172, wave disc spring 190, and spring retainer 194 are preferably provided as a single component, although they may be manufactured either as separate parts that are fused together or as a single unitary piece.

Greens Restrictor Body 172

Referring to FIGS. 15 through 18, greens restrictor body 172 includes a hollow outer cylindrical portion 174 and a forwardly projecting hollow inner tubular portion 180 wherein the hollow outer cylindrical portion 174 is wider in diameter than hollow inner tubular portion 180. Hollow outer cylindrical portion 174 includes an interior conical wall 176 transitioning from a rear opening 178 to the tubular portion 180 which forwardly extends to and terminates at a front opening 182.

At the inside juncture of hollow outer cylindrical portion 174 and tubular portion 180 is inner opening 184, which is about the same size as the flat tip 148 of the tapered nose 146 of the greens cutter 140.

Additionally, the interior conical wall 176 has an angle that corresponds to the angle of the tapered nose 146 of the greens cutter 140.

Furthermore, the interior conical wall 176 includes a plurality of spaced apart ribs 186 which interact with the spiral auger nose defined by the auger portion 156 of greens cutter 140 along tapered nose 146 for providing further food compression and juice extraction.

Moreover, three spaced apart tabs 187, 188, 189 are disposed on the exterior surface of the hollow outer cylindrical portion 174 and are complementarily shaped to be received in the three spaced apart notches 131, 132, and 133 disposed on the interior surface of the annular rim 126 of insert member 92 of screen insert 90.

Wave Disc Spring 190 and Spring Retainer 194

Figure 19:
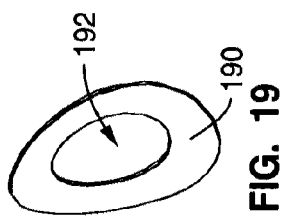
FIG. 19 is a front perspective view of a wave disc spring of the greens restrictor.

As shown in FIG. 19, the wave disc spring 190 is a circular disc having an alternating generally concave and convex shape or in other words, a disc that is almost flattened but with a wave. The wave disc spring 190 includes a central circular opening 192 sized to be received on hollow tubular portion 180.

Figure 20:
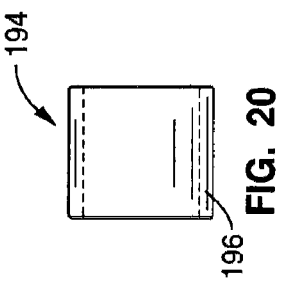
FIG. 20 is a side plan view of a spring retainer of the greens restrictor.
Figure 21:
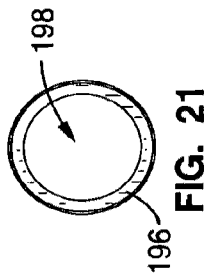
FIG. 21 is a front plan view of the spring retainer of the greens restrictor.
Figure 16:
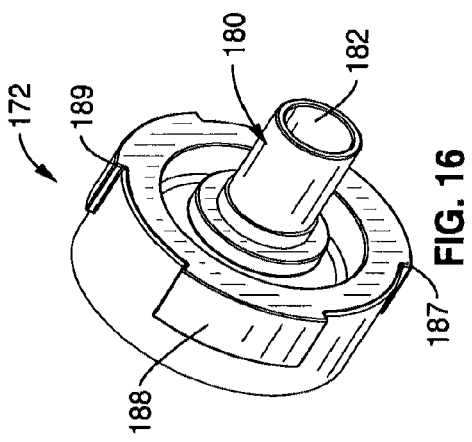
FIG. 16 is a side and front perspective view of the greens restrictor body illustrated in FIG. 15.
Figure 18:
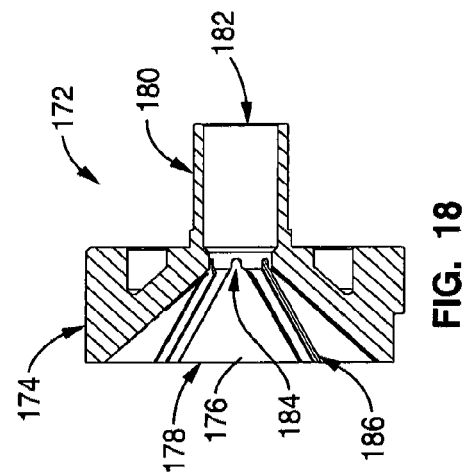
FIG. 18 is a sectional view of the greens restrictor body taken along line 18-18 of FIG. 17.
Figure 15:
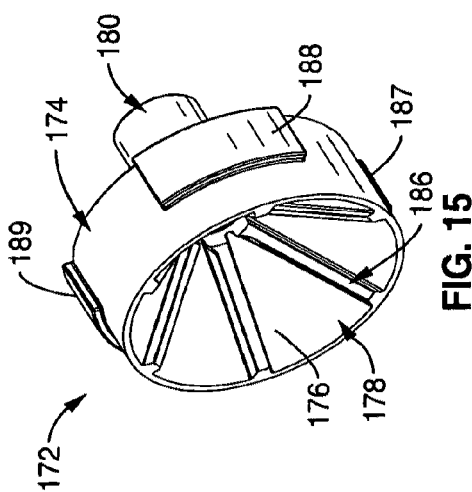
FIG. 15 is a rear and side perspective view of a greens restrictor body of a greens restrictor.
Figure 17:
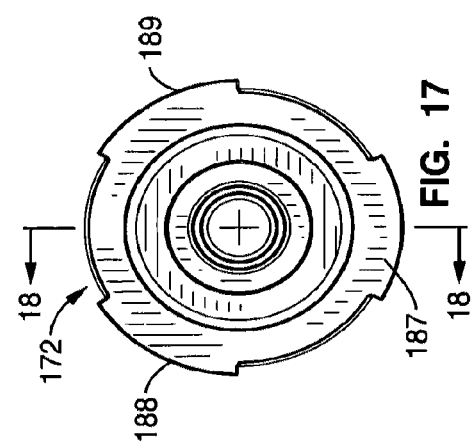
FIG. 17 is a front plan view of the greens restrictor body illustrated in FIG. 15.

As shown in FIGS. 20 and 21, the spring retainer 194 is comprised of a hollow cylindrical tube 196 having an open ended bore 198 extending therethrough and sized to be also received on hollow tubular portion 180 in a fixed position for precluding wave disc spring 190 from inadvertently slipping off hollow tubular portion 180.

Referring to FIGS. 2, 7, 8A, and 15 through 21, greens restrictor 170 attaches to screen insert 90 by sliding into front opening 130 of screen insert 90 such that three spaced apart tabs 187, 188, and 189 on greens restrictor body 172 fit into the three spaced apart notches 131, 132, and 133 disposed on an interior surface of the annular rim 126 of insert member 92 of screen insert 90.

Greens restrictor 170 abuts the wave disc spring 190 between the greens restrictor body 172 and a circular rear face or interior surface 204 of the restrictor nut 200 during juicing as will be further delineated hereinbelow. Hence, the wave disc spring 190 supports greens restrictor 170 against the restrictor nut 200 and allows the greens restrictor 170 to linearly translate back and forth for allowing a large amount of food solids to pass through the greens restrictor 170 while maintaining a constant compression force on the food solids thereby minimizing heat build-up during juicing and homogenizing of greens and other fibrous materials and precluding jamming of the juicer 10.

Restrictor Nut 200

Referring to FIGS. 22 through 24, the restrictor nut 200 is comprised of a cylindrically shaped disk member 202 having a circular rear face 204 and a periphery transitioning into a rearwardly extending annularly shaped sidewall 206 defining a cylindrically shaped pocket 208 with circular rear face 204. The rearwardly extending annularly shaped sidewall terminates to a rear annular edge 210 defining a rear circular opening 212 of the pocket 208. Three spaced apart L-shaped tabs 213, 214, 215 project away from an exterior surface of the annularly shaped sidewall 206 immediately adjacent the rear annular edge 210. A ribbed portion 216 circumscribes the annularly shaped sidewall and the cylindrically shaped disk from a location immediately forward the three spaced apart L-shaped tabs to a front face 218 of the cylindrically shaped disk member 202. Front face 218 transitions into a forwardly extending rectangularly shaped neck portion 220 having two opposing straight sides 222, 224 and two opposing curved sides 226, 228. The neck portion 220 transitions into a thin rectangularly shaped head 230 comprised of a flat front face 231, two opposing straight sides 232, 234, and two opposing curved sides 236, 238 that overhang the neck portion 220 for forming a groove 240. An open ended cylindrical bore 242 extends through the circular rear face 204, the cylindrically shaped disk member 202, the neck portion 220, and the head 230 along a central axis and defines a rear opening 244 and a front opening 246 in the restrictor nut 200. The open ended cylindrical bore 242 is sized to accommodate cylindrical tube 196 of the spring retainer 194 received on hollow tubular portion 180 of the greens restrictor 170 and the cylindrically shaped pocket 208 is sized to receive the hollow outer cylindrical portion 174 of the greens restrictor 170.

Restrictor nut 200 attaches to the front of main body 32 by mating the three spaced apart L-shaped tabs 213, 214, and 215 with the three inwardly projecting tabs 61, 63, and 65 extending from the interior surface of the hollow conical portion 60 of main body 32. Restrictor nut 200 should be attached such that after it is attached, it is oriented with the neck having its two opposing straight sides 222, 224 in a vertical position and its two opposing curved sides 226, 228 in a horizontal position in order to allow deflector 250 to be properly attached to restrictor nut 200. Restrictor nut 200 is used to restrain the linear translation of the greens restrictor 170 and may also be used to facilitate the attachment of a plastic bag to juicer 10 to collect solids expelled out deflector 250.

Deflector 250

Referring to FIGS. 25 and 26, and in one embodiment, the deflector 250 includes a curved top wall 252 transitioning into a semi-circular front wall 254 terminating to a flat bottom periphery 256 defining a semi-circular bottom opening 257. The curved top wall 252 and the semi-circular front wall 254 rearwardly extend to an inverted U-shaped flat back edge 258 defining an inverted U-shaped opening 259 bordered by an inverted U-shaped ridge 260 comprised of a curved top ridge 262 downwardly transitioning to a pair of spaced apart vertical ridges 264 and 266.

The deflector 250 is attached to the restrictor nut 200 by sliding the inverted U-shaped ridge 260 into the groove 240 of the restrictor nut 200 such that the curved top ridge 262 of the deflector 250 engages the curved side 226 of the neck portion 220 and the spaced apart vertical ribs 264, 266 respectively engage the two opposing straight sides 222, 224 of the neck portion 220 for acting as a shield and guiding solid food downward into a container for ease of collection and to minimize the possibility of solids flying out of the juicer during high-speed operations.

Motor Control System 270

Figure 27:
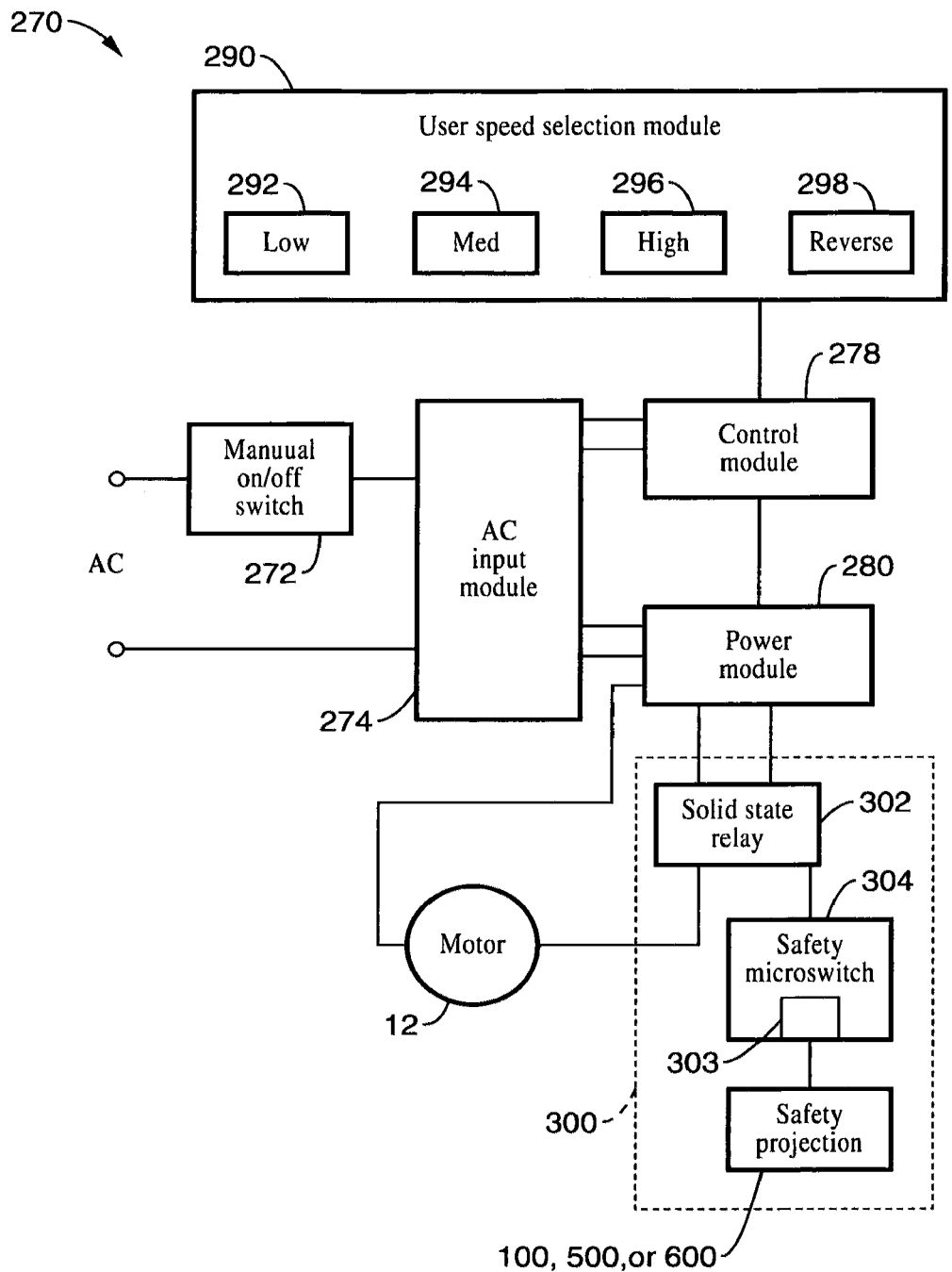
FIG. 27 is a block diagram view of an embodiment of a motor control system including a safety switch system.

Referring to FIG. 27, and in one embodiment, the juicer 10 is further comprised of a motor control system 270 comprised of a manual on/off switch 272, an AC input module 274, a control module 278, a power module 280, a user speed selection module 290, and a safety switch system 300 operatively coupled to motor 12.

In one embodiment, the manual on/off switch 272 is coupled in series between the AC input module 274 which is coupled to an AC power source for allowing the AC input module 274 to receive power from the power source when the manual on/off switch 272 is in the on position and for interrupting power from the AC power source to the AC input module 274 when the manual on/off switch 272 is in the off position. The AC input module 274 is operatively coupled to both the control module 278 and the power module 280 for providing voltage and current requirements for the respective modules 278, 280. The control module 278 is operatively coupled to the power module 280 and user speed selection module 290. The power module 280 is connected to the motor 12 wherein the control module 278 controls the motor speed through the power module 280 in response to a user selected speed set by means of the user speed selection module 290 which typically develops digital signals as a function of the status of a rotary type switch, a slide type switch, a lever toggle type switch, or a pushbutton switch.

In one embodiment, the user speed selection module 290 is provided with a low speed selection switch or pushbutton 292 which corresponds to a motor speed of about 300 rpm to about 350 rpm, a medium speed selection switch or pushbutton 294 which corresponds to a motor speed of about 600 rpm to about 1000 rpm, and a high speed selection switch or pushbutton 296 which corresponds to a motor speed of about 1200 rpm to about 1725 rpm or, in another embodiment, a motor speed of about 1500 rpm to about 3000 rpm.

Additionally, the user speed selection module 290 can include a reverse selection switch or pushbutton 298 to reverse the motor 12.

Furthermore, the user speed selection module 290 can incorporate the manual on/off switch 272.

Alternatively, and for single speed operation, the user speed selection module 280 can be eliminated and the control module 278 designed for a single set speed.

The AC input module 274, the control module 278, the power module 280, and the user speed selection module 290 can be designed from discreet components and/or integrated circuits as is evident to those having ordinary skill in the art, informed by the present disclosure.

Additionally, motor 12 may be any suitable motor, such as, a universal motor, an induction motor, a brush type DC motor, a brushless DC motor, or the like which is capable of driving the cutters 140 or 340 for greens juicing, vegetable juicing, homogenizing, shredding, and/or other user creative purposes.

The inventor has found that a motor of approximately ⅓ horsepower provides sufficient torque for all operations.

Safety Switch System 300

Referring to FIGS. 1 and 27, the motor control system 270 is further comprised of safety switch system or means 300 comprised of a solid state relay 302 operatively coupled between the power module 280 and the motor 12; the safety microswitch 304 operatively coupled to the solid state relay 302 and including microswitch push button 303; and at least one of the safety projections 100, 500, and 600 formed with respective inserts 90, 490, and 590 for coacting with the push button 303 of the safety microswitch 304.

In one embodiment, the microswitch 304 is mounted on an inside surface of the hub 20 and the microswitch push button 303 projects through an opening in hub 20 and into the indentation 48 of the rear annular flange 40 when insert 90, 490, or 590 is absent thereby precluding the juicer from being operated. When insert 90, 490, or 590 is properly attached, the safety projection 100 on the screen insert 90, the safety projection 500 on the homogenizing insert 490, or the safety projection 600 on the shredder insert 590 is received in the indentation 48 disposed in the rear annular flange 40 of the main body 32 and causes the microswitch push button 303 to be depressed thereby activating the solid state relay 302 to send current to the motor 12 via the power module 280 for energizing the juicer 10.

More specifically, when the manual switch 272 is in the on position, a voltage will be provided to the solid state relay 302. However, current will not flow through the solid state relay 302 and the motor 12 will not be energized until the main body 32 with the insert 90, 490, or 590 is received therein both are connected to the hub 20 such that the projection 100, 500, or 600 addresses the microswitch push button 303 of the microswitch 304.

Thus, if the main body 32 is attached to hub 22 without one of the inserts in place, then safety microswitch 304 does not allow motor 12 to operate. Hence, even with the manual switch 272 in the on position, the juicer 10 requires the actuation of safety microswitch 304 by one of the projections on the inserts for allowing power to be transmitted to the motor in a safe manner.

Use and Operation of Greens Juicing Configuration 30

To use and operate juicer 10 in greens juicing configuration 30, the user first assembles the components shown in FIG. 2 to the motor shaft 24 and hub 20 shown in FIG. 1. Now referring to FIGS. 1 through 27, the assembly is accomplished by sliding the greens cutter 140 onto motor shaft 24 and then inserting the screen insert 90 through the open back end 42 of the main body 32 with the projection 100 on the screen insert 90 received within the indentation 48 of the annular flange 40. Next, the main body 32, with the screen insert 90 inserted therein, is placed over the greens cutter 140 and connected to the hub 22 by lining up the cut-out notches 44 on the annular flange 40 with the corresponding in turned ears 24 on the hub 20 and then linearly translating the main body 32 with screen insert 90 therein towards the hub 20 and finally turning the main body 32 and screen insert 90 counterclockwise for allowing the annular flange 40 to slide under the in turned ears 24 until the radially extending stop 46 comes in contact with the uppermost in turned ear of the plurality of in turned ears 24 for providing a locking connection. The greens restrictor 170 with greens restrictor body 172, wave disc spring 190, and spring retainer 194 is slid into the front opening 130 of the screen insert 90 as delineated above. Restrictor nut 200 is attached to front of main body 32 via tabs 213, 214, and 215 by a counterclockwise rotation. Deflector 250, which is optional, is slid into groove 240 between neck 220 and head 230 of restrictor nut 200. A container is placed below juice outlet 82 to collect the juice and another container is placed below deflector 250 to collect the expelled solids which are typically discarded.

Once assembled, a speed is selected via user speed selection module 290 and the juicer 10 is turned on via manual on/off switch 272. Typically, and in one embodiment, a low speed is selected for the greens juicing configuration 30. Next, food is placed into the feeding tube 70 via feed tube opening 74 and tamper 76 is employed to assist in forcing the food to the cutter 140 by pulsing or moving the tamper 76 up and down. The food passes through opening 106 in screen insert 90 makes contact with cutting portion 154 of greens cutter 140. The rotating blades 156, 158 function both as a cutter and an auger; they cut the food and push it forward along the length of cutting portion 154 to auger portion 156. The cut food is squeezed or compressed between ribs 109, 110, 111, and 114 of screen insert 90 and greens cutter 140 to extract the juice. The juice is circumferentially forced out screen cone member 134 by way of windows 120 and circulates around the outside of screen insert 90. Furthermore, the plurality of spaced apart ribs 186 disposed on the interior conical wall 176 of the restrictor body 172 interact with the auger portion 156 along tapered nose 146 for providing further food compression and juice extraction. The action of gravity causes the extracted juice to collect into at the bottom surfaces of the hollow cylindrical portion 50 and the hollow conical portion 60 which taper or funnel toward the downwardly extending abbreviated hollow outlet tube 80 to promote juice flow out of juice outlet 82 into the container below. The solid material does not pass out screen cone 36, but is forced forward through greens restrictor 170 and out restrictor nut 200 where it is downwardly deflected by deflector 250 into a container below.

Disassembly of the greens juicing configuration 30 can be accomplished by reversing the above assembly steps.

Vegetable Juicing Configuration 330

Figure 28:
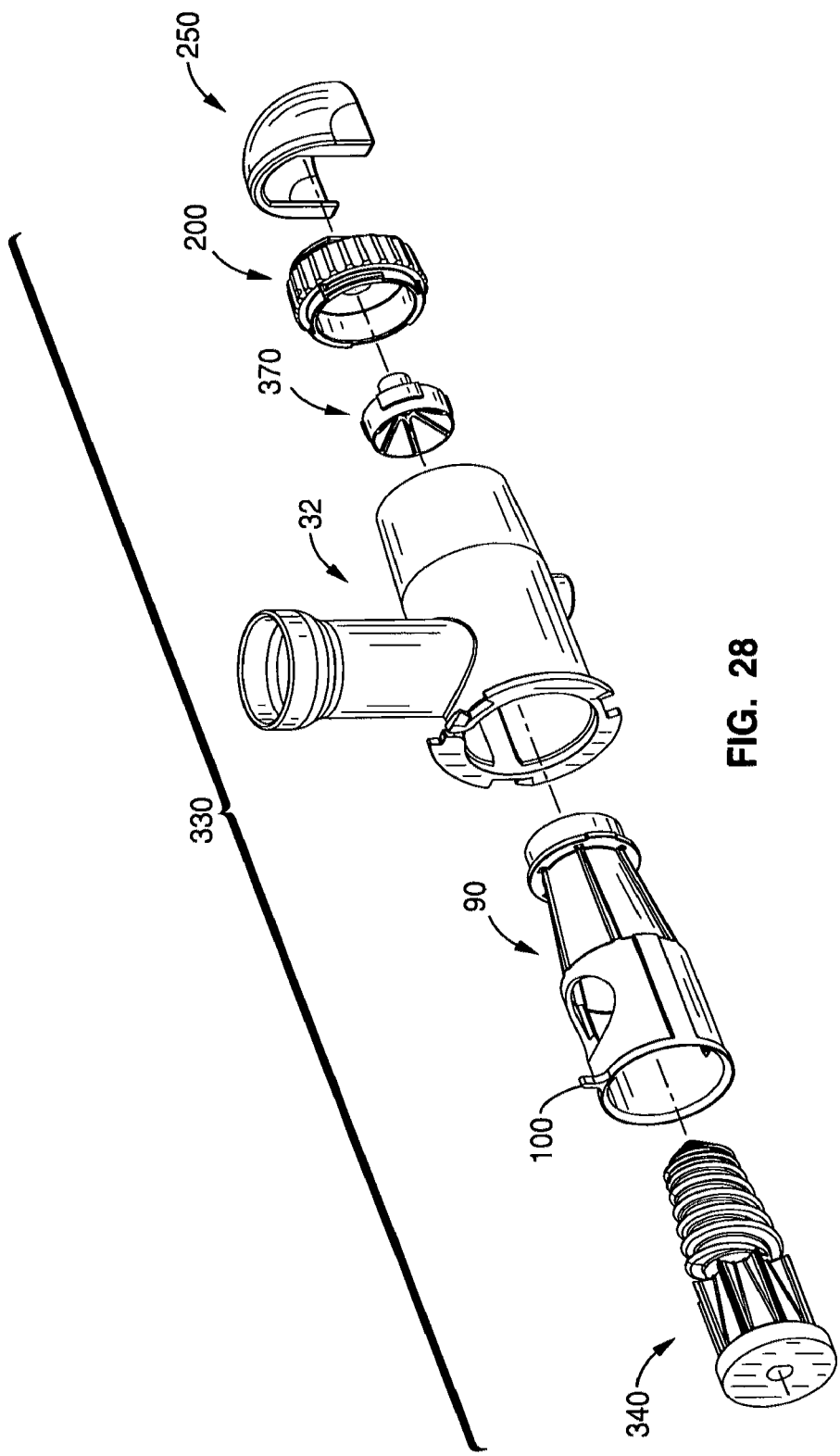
FIG. 28 is an exploded parts perspective view of a vegetable juicing configuration.

FIG. 28 shows an exploded parts perspective view of the vegetable juicing configuration 330 of the juicer 10 for preferably juicing hard vegetables, such as carrots or beets. Vegetable juicing configuration 330 is comprised of the grinding cutter 340, the screen insert 90, the main body 32, a vegetable restrictor 370, the restrictor nut 200, and the optional deflector 250.

Screen insert 90, main body 32, restrictor nut 200, and optional deflector 250 are as described above.

Grinding Cutter 340

Figure 31:
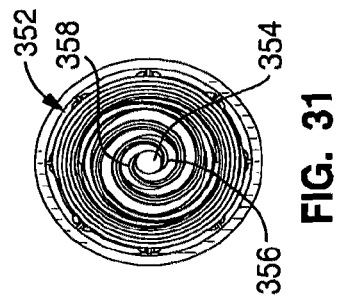
FIG. 31 is a front plan view of the grinding cutter illustrated in FIG. 29.
Figure 30:
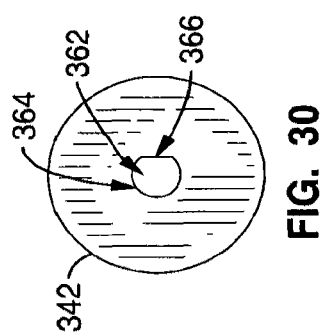
FIG. 30 is a rear plan view of the grinding cutter illustrated in FIG. 29.
Figure 29:
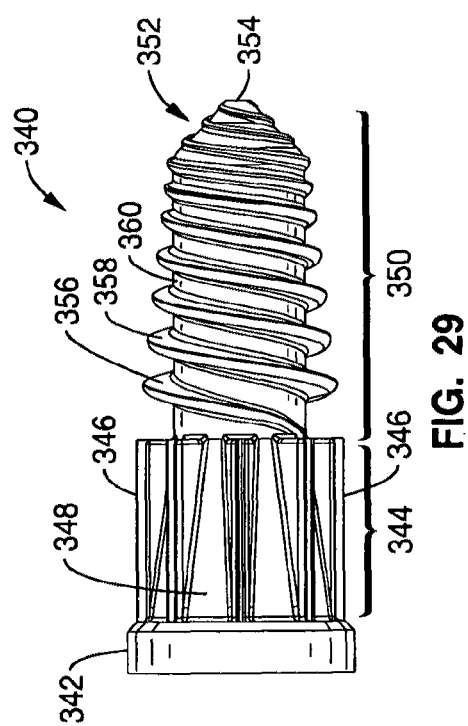
FIG. 29 is a side plan view of an embodiment of a grinding cutter.

As shown in FIGS. 29 through 31, the grinding cutter 340 is comprised of rear base 342 transitioning into an elongated body or member having a cutting portion 344 and a spiral auger portion 350. The cutting portion 344 comprised of a plurality of straight, substantially parallel saw toothed cutting blades 346 longitudinally extending along cutting portion 344 and circumferentially spaced apart from one another forming grooves 348 therebetween. The grooves 348 slope downwardly from the base 342 along the length of the cutting portion 344 to promote food flow. Cutting portion 344 has, in one embodiment, a length of about one-third the total length of grinding cutter 340 and includes about eight blades 346, although a greater or lesser number of blades 346 may be used. Blades 346 are preferably made of stainless steel and may be molded separately from or integrally with cutter 340.

The grinding cutter 340 further includes the spiral auger portion 350 forwardly transitioning from the cutting portion 344 and running along a tapered front nose 352 having a blunt, flattened tip 354. The taper of the spiral auger portion 350 along front nose 352 forms a spiral auger nose which, in one embodiment, is tapered at about a 45 degree angle. The spiral auger portion 350 is formed by two projecting helical ribs 356, 358 which start at opposing first ends which are spaced apart about one hundred eighty degrees and which are immediately adjacent the cutting portion 344 and which continue along up to the blunt, flattened tip 354 where they terminate to seconds ends. The two projecting helical ribs 356, 358 form grooves 360 therebetween and the width of the grooves 360 between the two helical ribs 356, 358 decreases just prior to and along tapered front nose 352.

A blind bore 362 extends through the base 342 forming a circular opening 364 with a flat side 366 and continues through the cutting portion 344 and partially through the auger portion 350 up to the nose 352, but not through nose 352. The blind bore 362 and flat side 366 are sized and shaped to accommodate motor shaft 24 and flat side 26.

Grinding cutter 340 is sized to fit inside screen insert 90, homogenizing insert 490, or shredder insert 590.

Vegetable Restrictor 370

Figure 33:
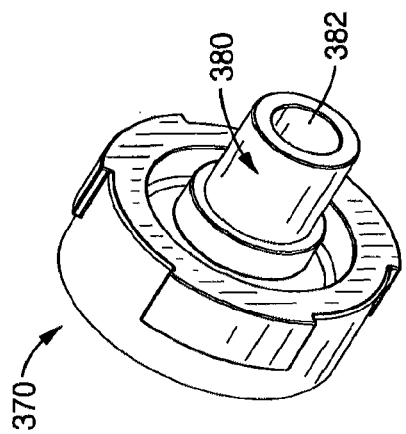
FIG. 33 is a side and front perspective view of the vegetable restrictor illustrated in FIG. 32.
Figure 32:
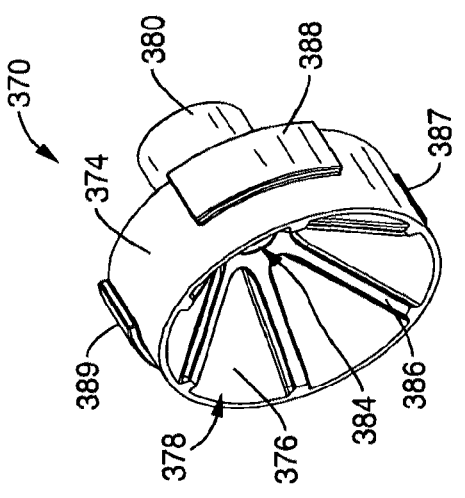
FIG. 32 is a rear and side perspective view of a vegetable restrictor.

As shown in FIGS. 32 and 33, vegetable restrictor 370 is similar to greens restrictor body 172 and is used during juicing of less fibrous materials than wheatgrass, when heat build-up is not a concern, to increase juice extraction.

Vegetable restrictor 370 includes a hollow outer cylindrical portion 374 and a forwardly projecting hollow inner tubular portion 380 wherein the hollow outer cylindrical portion 374 is wider in diameter than hollow inner tubular portion 380. Hollow outer cylindrical portion 374 includes an interior conical wall 376 transitioning from a rear opening 378 to the tubular portion 380 which forwardly extends to and terminates at a front opening 382. At the inside juncture of hollow outer cylindrical portion 374 and tubular portion 380 is inner opening 384, which is about the same size as the flat tip 354 of the tapered nose 352 of the grinding cutter 340.

Additionally, the interior conical wall 376 has an angle that corresponds to the angle of the tapered nose 352 of the grinding cutter 340. Furthermore, the interior conical wall 376 includes a plurality of spaced apart ribs 386 which interact with the auger portion 350 along tapered nose 352 of the grinding cutter 340 for providing further food compression and thus, juice extraction. Moreover, three spaced apart tabs 387, 388, and 389 are disposed on the exterior surface of the hollow outer cylindrical portion 374 and are complementarily shaped to be received in the three spaced apart notches 131, 132, and 133 disposed on the interior surface of the annular rim 126 of insert member 92 of screen insert 90.

Use and Operation of Vegetable Juicing Configuration 330

The use and operation of juicer 10 in the vegetable juicing configuration 330 is similar to the use and operation of the greens juicing configuration 30 with the exception of using the grinding cutter 340 instead of the greens cutter 140 and using the vegetable restrictor 370 instead of the greens restrictor 170. Hence, the user first assembles the components shown in FIG. 28 to the motor shaft 24 and hub 20 shown in FIG. 1 in a similar fashion described hereinabove for the greens juicing configuration 30.

Once assembled, the juicer 10 is turned on via manual on/off switch 272 and a speed is selected via user speed selection module 290. Typically, and in one embodiment, a high speed is selected of about 1725 rpm for juicing hard vegetables. Next, food is placed into the feeding tube 70 via feed tube opening 74 and tamper 76 is employed to assist in forcing the food to the grinding cutter 340 by pulsing or moving the tamper 76 up and down. The food passes through opening 106 in screen insert 90 makes contact with cutting portion 344 of grinding cutter 340 wherein the food is cut and pushed forward to auger portion 350. The cut food is squeezed between ribs 109, 110, 111, and 114 of screen insert 90 and grinding cutter 340 to extract the juice. The juice is circumferentially forced out screen cone member 134 by way of windows 120 and circulates around the outside of screen insert 90. Furthermore, the plurality of spaced apart ribs 386 disposed on the interior conical wall 376 of the vegetable restrictor 370 interact with the auger portion 350 along tapered nose 352 for providing further food compression and juice extraction. The action of gravity causes the extracted juice to collect into at the bottom surfaces of the hollow cylindrical portion 50 and the hollow conical portion 60 which taper or funnel toward the downwardly extending abbreviated hollow outlet tube 80 to promote juice flow out of juice outlet 82 into a container below. The solid material does not pass out screen cone 36, but is forced forward through vegetable restrictor 370 and out restrictor nut 200 where it is downwardly deflected by deflector 250 into a container below.

Disassembly of the vegetable juicing configuration 330 can be accomplished by reversing the assembly steps.

Homogenizing Configuration 430

FIG. 34 shows an exploded parts perspective view of the homogenizing configuration 430 of the juicer 10 for preferably preparing foods such as baby food, sauces, sorbets, nut butters, and purees. The homogenizing configuration 430 includes grinding cutter 340, homogenizing insert 490, main body 32, vegetable restrictor 370 or greens restrictor 170, restrictor nut 200, and optional deflector 250.

Grinding cutter 340, main body 32, vegetable restrictor 370, greens restrictor 170, restrictor nut 200, and optional deflector 250 are as described above.

Homogenizing Insert 490

As shown in FIGS. 34 through 36, homogenizing insert 490 is identical to screen insert 90 with the exception that homogenizing insert 490 does not have screen cone 134 or widows 120 of the front conical section 112 of the screen insert 90, but instead has a open ended closed sided front conical section 512.

More specifically, and referring to FIGS. 34, 35, 36A, and 36B, the homogenizing insert 490 is comprised of an open ended hollow rear cylindrical section 494 having a rear annular lip 496 defining a rear opening 498 of homogenizing insert 490. The safety projection 500 radially extends from a top section of the rear annular lip 496 and the open ended hollow rear cylindrical section 494 transitions from the rear annular lip 496 to a front annular edge 502 defining a front opening of the rear cylindrical section 494.

An opening 506 is formed through the top of the rear cylindrical section 494 and is in open communication with the upwardly extending hollow feeding tube 70 via the top opening 56 of cylindrical portion 50 when the homogenizing insert 490 properly mates with main body 32. Additionally, the rear cylindrical section 494 includes two exterior longitudinally extending tabs 504, 508 disposed on opposite sides of the rear cylindrical section 494. The two exterior longitudinally extending tabs 504, 508 correspond to and mate with the two interior diametrically opposed longitudinally extending channels 52, 54 of the hollow cylindrical portion 50 of main body 32. Furthermore, the rear cylindrical section 494 includes three interior spaced apart longitudinally extending ribs 509, 510, and 511 which rearwardly extend from the front opening defined by the front annular edge 502 of the rear cylindrical section 494 and terminate prior to reaching the rear opening 498 of the rear cylindrical section 494.

The homogenizing insert 490 is further comprised of an open ended closed sided front conical section 512 that is integrally formed with and transitions forwardly from the front annular edge 502 of the rear cylindrical section 494 and terminates to an annular collar 522. The open ended closed sided front conical section 512 includes a plurality of interior, spaced apart ribs 514. In one embodiment, there are six spaced apart ribs 514 with every other one of the ribs 514 being continuous with one of the longitudinally extending ribs 509, 510, and 511 disposed within the interior of rear cylindrical section 494. The plurality of spaced apart ribs 514 extend the length of the open ended closed sided front conical section 512. In another embodiment, the homogenizing insert 490 can be formed as two pieces comprised of the rear cylindrical section 494 and the open ended closed sided front conical section 512.

The annular collar 522 radially outwardly extends from the front conical section 512 and includes two diametrically opposed exterior tabs 521, 523 radially extending therefrom for mating with the two diametrically opposed spacings between the two partially circumferential ribs 66, 68 disposed within the interior of the main body 32.

The annular collar 522 forwardly steps down and transitions into to a hollow annular rim 524 which extends through the open front end 62 of the main body 32 and terminates to a front circular edge 525 defining a front opening 526 for the expulsion of solids. Three spaced apart notches 527, 528, and 529 are disposed on an interior surface of the annular rim 524 and rearwardly extend from the front circular edge 525 for receiving three complementarily shaped tabs 387, 388, and 389 disposed on the exterior surface of vegetable restrictor 370.

In homogenizing configuration 430, the homogenizing insert 490 functions to force all of the food out the front opening 526 and thus, out the front of juicer 10, and out deflector 250, with no juice coming out juice outlet 82. Additionally, either vegetable restrictor 370 or greens restrictor 170 may be used in the homogenizing configuration 43. The choice depends on the material to be homogenized and the desired consistency of the puree. In most cases, vegetable restrictor 370 is preferable. Vegetable restrictor 370 and greens restrictor 170 attach to homogenizing insert 490 in the same way that they attach to screen insert 90 as described above.

Use and Operation of Homogenizing Configuration 430

The use and operation of juicer 10 in the homogenizing configuration 430 is similar to the use and operation of the greens juicing configuration 30 with the exception of using the grinding cutter 340 in place of the greens cutter 140, using the homogenizing insert 490 in place of the greens insert 90, and using the vegetable restrictor 370 in place of the greens restrictor 170 although, the greens restrictor 170 may be used as noted above. Additionally, the homogenizing configuration 430 is similar to the use and operation of the vegetable juicing configuration 330 with the exception of using the homogenizing insert 490 in place of the greens insert 90.

Hence, the user first assembles the components shown in FIG. 34 to the motor shaft 24 and hub 20 shown in FIG. 1 in a similar fashion described hereinabove for the greens juicing configuration 30.

Once assembled, a speed is selected via user speed selection module 290 and the juicer 10 is turned on via manual on/off switch 272. Typically, and in one embodiment, a high speed is selected for the homogenizing configuration 430. Next, food is placed into the feeding tube 70 via feed tube opening 74 and tamper 76 is employed to assist in forcing the food to the grinding cutter 340 by pulsing or moving the tamper 76 up and down. The food passes through opening 506 in homogenizing insert 490 and makes contact with cutting portion 344 of grinding cutter 340 wherein the food is cut and pushed forward to auger portion 350. The cut food is squeezed or compressed between ribs 509, 510, 511, and 514 of homogenizing insert 490 and grinding cutter 340 to process the cut food into a uniform mixture. The uniform mixture or homogenized food is forced forward through vegetable restrictor 370 and out restrictor nut 200 where it is downwardly deflected by deflector 250 into a container below.

Disassembly of the homogenizing configuration 430 can be accomplished by reversing the assembly steps.

Shredder Configuration 530

Figure 37:
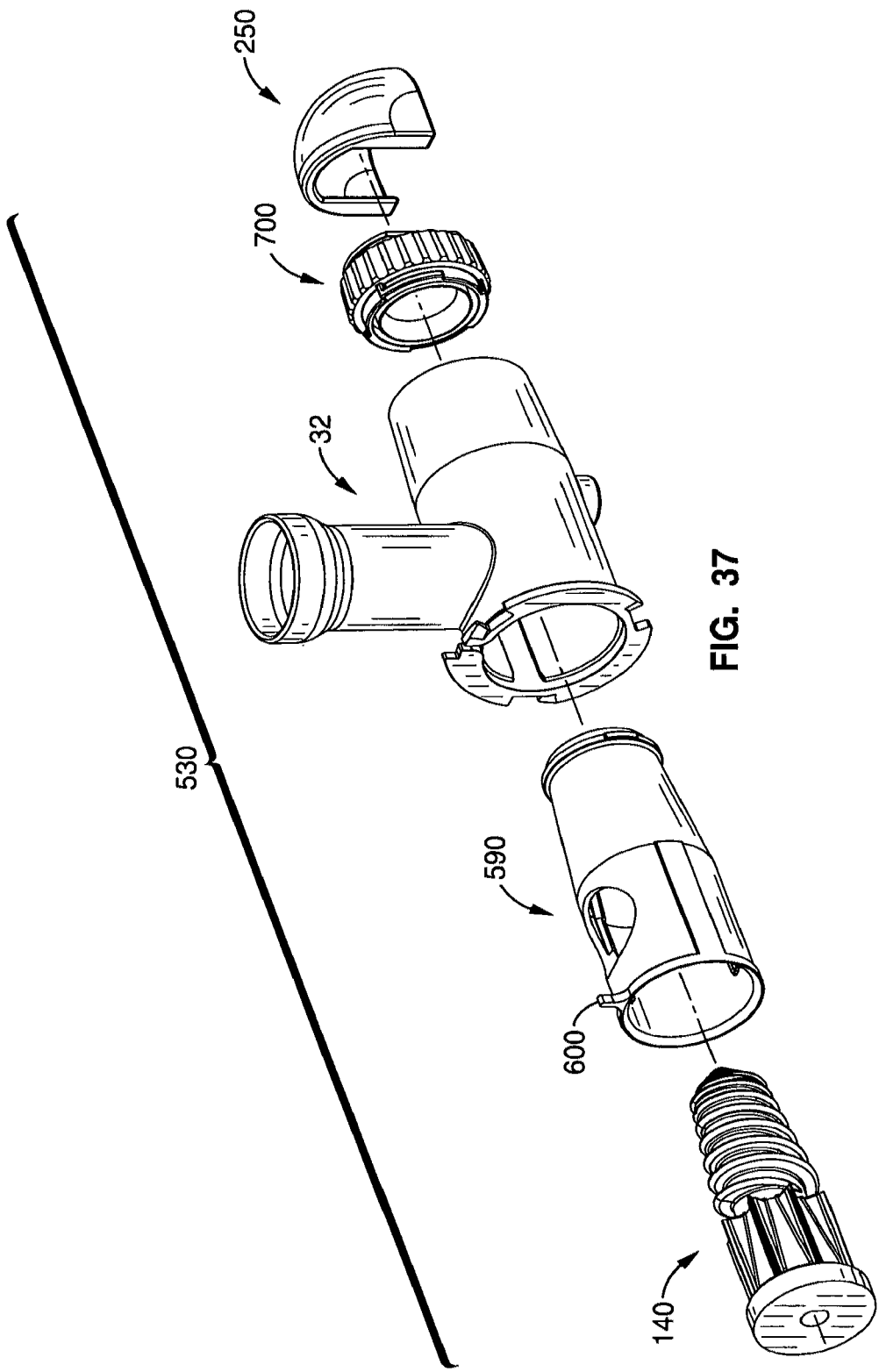
FIG. 37 is an exploded parts perspective view of an embodiment of a shredder configuration.

FIG. 37 shows an exploded parts perspective view of the shredder configuration 530 of the juicer 10 for preferably shredding hard or soft vegetables such as for salads, coleslaw, and cakes or muffins, such that no juice is produced. The shredder configuration 530 includes greens cutter 140, shredder insert 590, main body 32, shredder nut 700, and optional deflector 250. Alternatively, instead of greens cutter 140, grinding cutter 340 may be used to achieve a more finely ground material.

Greens cutter 140, grinding cutter 340, main body 32, and deflector 250 are as described above.

Shredder Insert 590

As shown in FIG. 38, shredder insert 590 is similar to homogenizing insert 490, but it is slightly shorter than both homogenizing insert 490 and main body 32.

More specifically, and referring to FIGS. 37 through 39, the shredder insert 590 is comprised of an open ended hollow rear cylindrical section 594 having a rear annular lip 596 defining a rear opening 598 of shredder insert 590. The safety projection 600 radially extends from a top section of the rear annular lip 596 and the open ended hollow rear cylindrical section 594 transitions from the rear annular lip 596 to a front annular edge 602 defining a front opening of the rear cylindrical section 594.

An opening 604 is formed through the top of the rear cylindrical section 594 and is in open communication with the upwardly extending hollow feeding tube 70 via the top opening 56 of cylindrical portion 50 when the shredder insert 590 properly mates with main body 32. Additionally, the rear cylindrical section 594 includes two exterior longitudinally extending tabs 606, 608 disposed on opposite sides of the rear cylindrical section 594. The two exterior longitudinally extending tabs 606, 608 correspond to and mate with the two interior diametrically opposed longitudinally extending channels 52, 54 of the hollow cylindrical portion 50 of main body 32.

The shredder insert 590 is further comprised of an open ended closed sided front conical section 612 that is integrally formed with and transitions forwardly from the front annular edge 602 of the rear cylindrical section 594 and terminates to an annular collar 622. The open ended closed sided front conical section 612 and the rear cylindrical section 594 includes a plurality of interior, spaced apart ribs 609, 610, and 611 which longitudinally extend from the annular collar 622 and terminate prior to reaching the rear opening 598 of the rear cylindrical section 594.

The annular collar 622 radially outwardly extends from the front conical section 612 and includes two diametrically opposed exterior tabs 621, 623 radially extending therefrom for mating with the two diametrically opposed spacings between the two partially circumferential ribs 66, 68 disposed within the interior of the main body 32.

The annular collar 622 forwardly steps down and transitions into to a hollow annular rim 624 which terminates to a front circular edge 625 defining a front opening 626 for the expulsion of solids.

In shredder configuration 530, the shredder insert 590 functions to force all of the food out front opening 626 and thus, out the front of juicer 10, and out deflector 250, with no juice coming out juice outlet 82. Hence, shredder insert 590 facilitates the expulsion of chopped food while minimizing compression and juice extraction.

In another embodiment, the shredder insert 590 can be formed as two pieces comprised of the open ended hollow rear cylindrical section 594 and the open ended closed sided front conical section 612.

Shredder Nut 700

As shown in FIGS. 40 through 44, shredder nut 700 is similar to restrictor nut 200. Shredder nut 700 includes a back face 702, an externally ribbed cylindrical body 704, a neck portion 706, a front face 708, and an open ended bore 710 extending through back face 702, cylindrical body 704, neck portion 706, and front face 708.

The back face 702 is provided with an annular groove 712 sized to accommodate the annular rim 624 of the shredder insert 590. Shredder nut 700 also includes three L-shaped tabs 714, 716, 718 projecting outward from an exterior side of the back face 702.

The front face 708 is spaced from the cylindrical body 704 by the neck portion 706 and the front face 708 overhangs the neck portion 706 thereby forming a groove 720 therebetween. Front face 708 is rectangularly shaped and includes two opposing straight sides 722, 724 and two opposing curved sides 726, 728. Additionally, the neck portion 706 is rectangularly shaped and includes two opposing straight sides 730, 732 and two opposing curved sides 734, 736 wherein the sides defines the shape of the bottom of the groove 720.

Shredder nut 700 attaches to the front of main body 32 by mating the three spaced apart L-shaped tabs 714, 716, 718 with the three inwardly projecting tabs 61, 63, and 65 extending from the interior surface of the hollow conical portion 60 of main body 32. Shredder nut 700 should be attached such that after it is attached, it is oriented with the neck having its two opposing straight sides 730, 732 in a vertical position and its two opposing curved sides 734, 736 in a horizontal position in order to allow deflector 250 to be properly attached to Shredder nut 700 in the same way that it attaches to restrictor nut 200 as described above. Shredder nut 700 is used to channel shredded food through the shredder insert 590 while minimizing compression and juice extraction. Deflector 250 attaches to shredder nut 700 in the same way that it attaches to restrictor nut 200 as described above.

Use and Operation of Shredder Configuration 530

The use and operation of juicer 10 in the shredder configuration 530 is similar to the use and operation of the greens juicing configuration 30 with the exception of using the shredder insert 590 in place of the greens insert 90, eliminating the greens restrictor 170, and using the shredder nut 700 in place of the restrictor nut 200.

Hence, the user first assembles the components shown in FIG. 37 to the motor shaft 24 and hub 20 shown in FIG. 1 in a similar fashion described hereinabove for the greens juicing configuration 30. Thus, greens cutter 140 or grinding cutter 340 is slid onto motor shaft 24. Body 32 with shredder insert 590 is assembled over cutter 140 or 340 and coupled to hub 20, shredder nut 700 is coupled to front of body 32, and deflector 250 is coupled to shredder nut 700 all as further delineated hereinabove. A container is placed below deflector 250 to collect the solid material.

Once assembled, a speed is selected via user speed selection module 290 and the juicer 10 is turned on via manual on/off switch 272. Typically, and in one embodiment, a medium or high speed is selected for the shredder configuration 530. Next, food is placed into the feeding tube 70 via feed tube opening 74 and tamper 76 is employed to assist in forcing the food to the greens cutter 140 or grinding cutter 340 by pulsing or moving the tamper 76 up and down. The food passes through opening 604 in shredder insert 590 and makes contact with cutting portion 154 of greens cutter 140 or with cutting portion 344 of grinding cutter 340 wherein the food is cut and pushed forward to auger portion 156 or 350. The coaction of the ribs 609, 610, and 611 of shredder insert 590 with the greens cutter 140 or grinding cutter 340 promote the shredding process. The shredded food is forced forward through shredder nut 700 where it is downwardly deflected by deflector 250 into the container below. Disassembly of the shredder configuration 530 can be accomplished by reversing the assembly steps.

Juicer 1010

Figure 45:
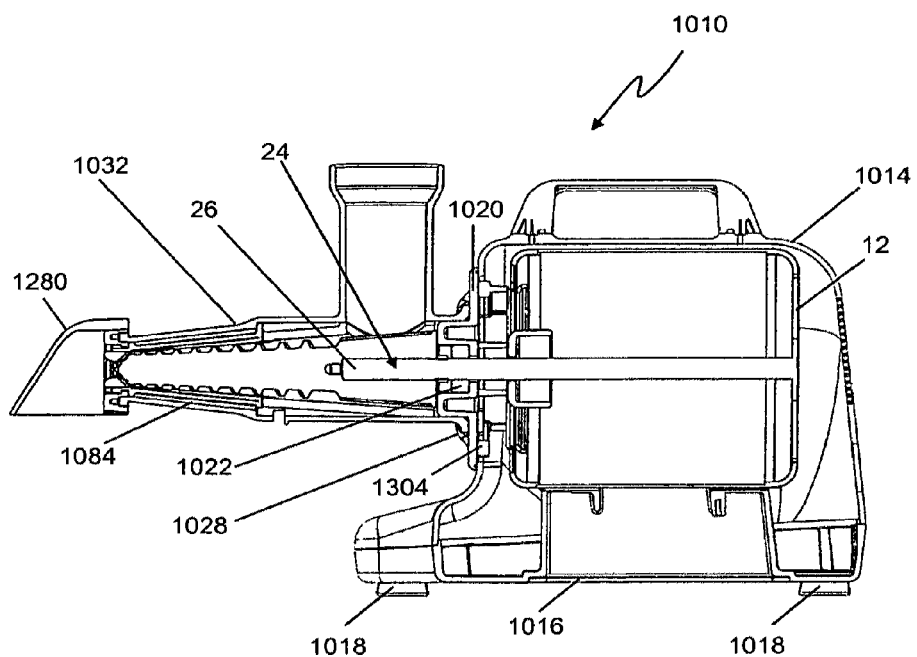
FIG. 45 is a side elevation view of another embodiment of a juicer with portions taken in section for clarity.

Referring to FIG. 45, and in one embodiment, the juicer 1010 is comprised of a horizontally disposed electrical motor 12 enclosed within a housing 1014 which includes a base 1016 supported on a surface via feet 1018. The housing 1014 is provided with a hub 1020 that includes a shaft seal 1022 to prevent contaminants escaping from or entering into electrical motor 12 from the external environment. A circular motor shaft 24 having a flat side 26 is driven by the electrical motor 12 and generally horizontally extends from motor 12, through both the hub 1020 and shaft seal 1022.

In one embodiment, the motor shaft 24 is about three and one-half inches long and about one-half inch in diameter and protrudes about two inches beyond the face of hub 1020.

The circular motor shaft 24 receives one of a plurality of different cutters or augers 1140 (FIG. 57) or 1340 (FIG. 70) associated with one of a plurality of different configurations of components that allow the juicer 1010 to be used for different purposes.

In one embodiment, the motor shaft 24 has a cross sectional shape and length which corresponds to a blind bore 1218 (FIG. 61), 1362 (FIG. 71) respectively disposed in each of the cutters 1140 and 1340 for preventing slippage between cutters 1140 and 1340, and motor shaft 24.

More specifically, and in one embodiment, the juicer 1010 has four main different configurations of components for allowing the juicer 1010 to be used for different purposes. The four main configurations comprise a greens juicing configuration 1030, a vegetable juicing configuration 1330, a homogenizing configuration 1430, and a shredder configuration which employs components from the greens and homogenizing configuration 1030, 1430 along with a shredder coupling 1730 (FIG. 77) as will be delineated in detail below.

The user can switch from one configuration to another by using a different arrangement of components and the components may be grouped differently by the user to create an alternative configuration that may serve a particular purpose.

Greens Juicing Configuration 1030

Figure 46:
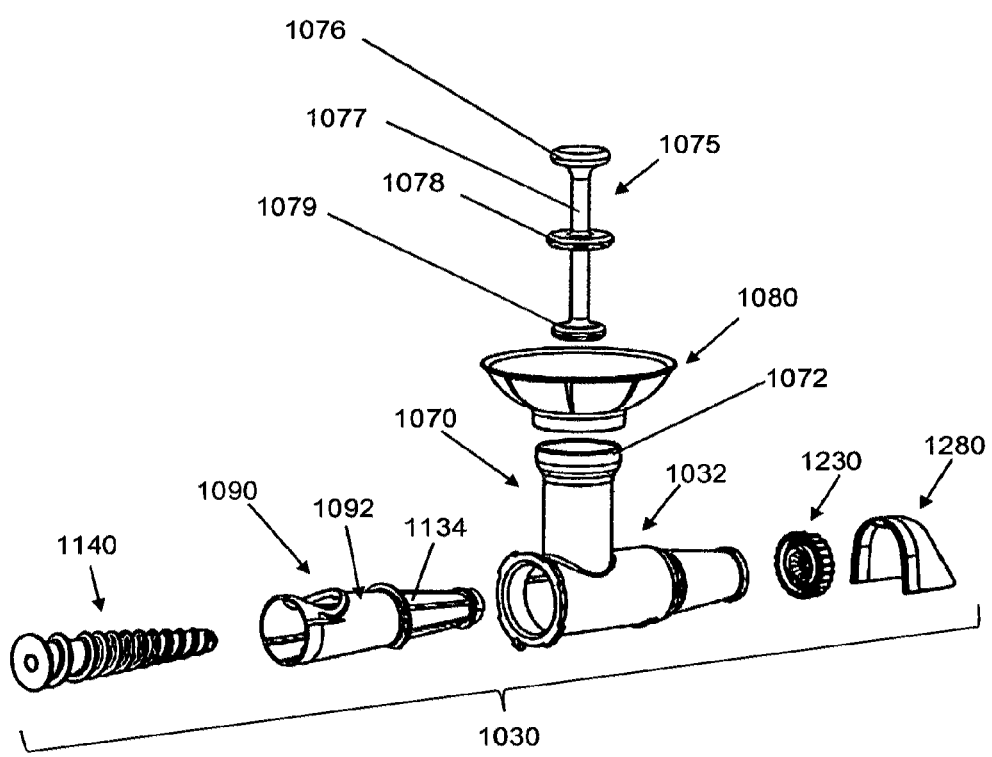
FIG. 46 is an exploded parts perspective view of another embodiment of a greens juicing configuration.

FIG. 46 shows an exploded parts perspective view of the greens juicing configuration 1030 of the juicer 1010 for preferably juicing greens, such as wheatgrass or leafy materials, or for juicing fruits and soft vegetables.

Figure 54:
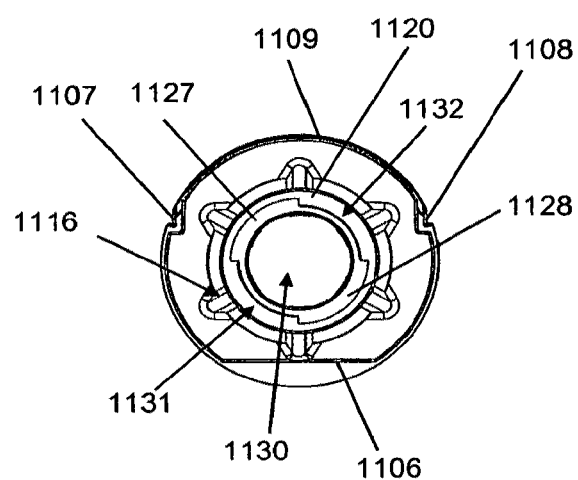
FIG. 54 is a front plan view of the insert member shown in FIG. 52.

In one embodiment, the greens juicing configuration 1030 includes a main or juicer body 1032 having an open back end 1042 (FIG. 47) and an open front end 1062 (FIG. 48), a screen insert 1090 received through the open back end 1042 of the main body 1032 and extending through the open front end 1062 thereof and having an open inner end 1098 (FIG. 52) and an open outer end or discharge opening 1130 (FIG. 54).

The greens juicing configuration 1030 further includes a greens cutter or auger 1140 having a blind bore 1218 (FIG. 62) received on the motor shaft 24 of the electrical motor 12.

The greens cutter 1140 is circumscribed by the screen insert 1090 received within the main body 1032 when the main body 1032 is connected to hub 1020.

The greens juicing configuration 1030 further includes a restrictor coupling 1230 received over the discharge opening 1130 of the screen insert 1090 and removeably coupled to the screen insert 1090 adjacent the discharge opening 1130.

An optional deflector 1280 slideably couples to the restrictor coupling 1230 adjacent discharge opening 1130 of the screen insert 1090.

Main Body 1032

Figure 47:
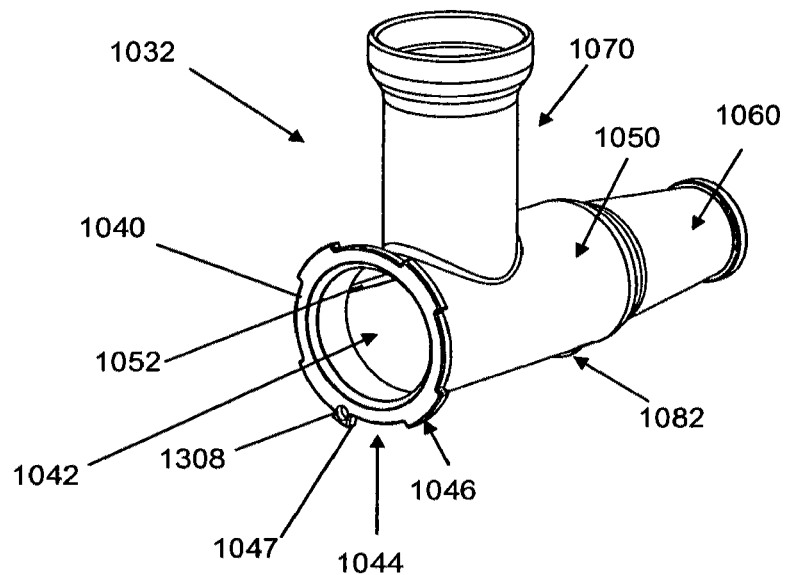
FIG. 47 is a back and side perspective view of another embodiment of a main body.

Referring to FIG. 47, and in one embodiment, the main body 1032 includes a rear annular flange 1040 that defines the open back end 1042 of the main body 1032, a hollow cylindrical portion 1050 integrally formed with and horizontally extending from the rear annular flange 1040, and a hollow conical portion 1060 integrally formed with and horizontally extending from the hollow cylindrical portion 1050 and terminating to the open front end 1062 (FIG. 48) of the main body 1032.

Additionally, the main body 1032 includes an upwardly extending hollow feeding tube 1070 and an outlet 1082 both integrally formed with and in open communication with the hollow cylindrical portion 1050.

Rear Annular Flange 1040

Rear annular flange 1040 defines the open back end 1042 of the main body 1032 and includes a plurality of circumferentially spaced cut-out notches 1044 for correspondingly engaging over a plurality of circumferentially spaced in turned ears 1028 integrally formed with hub 1020 and a plurality of circumferentially spaced tabs 1046 for engaging behind the plurality of circumferentially spaced in turned ears 1028.

Additionally, the annular flange 1040 includes a radially extending stop 1047 for alignment engagement with the lowermost in turned ear of the plurality of in turned ears 1028 when the main body 1032, with screen insert 1090 and auger 1140 received therein, is operatively coupled to the hub 1020.

Furthermore, the rear annular flange 1040 includes an embedded magnet 1308 for magnetically coupling or engaging with a proximity switch 1304 (FIG. 45) carried or mounted on an inside surface of the hub 1020.

Hollow Cylindrical Portion 1050

Figure 49:
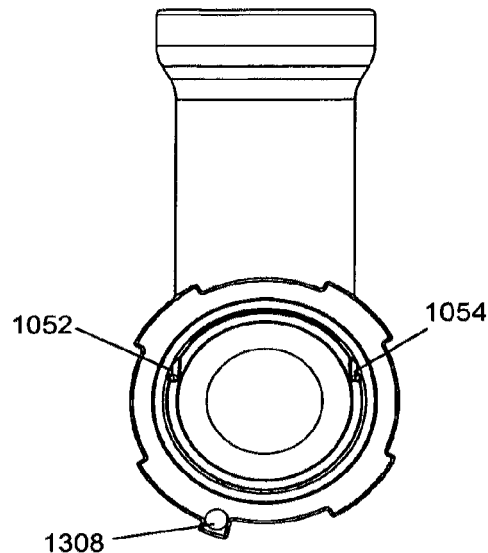
FIG. 49 is a rear plan view of the main body illustrated in FIG. 47.
Figure 50:
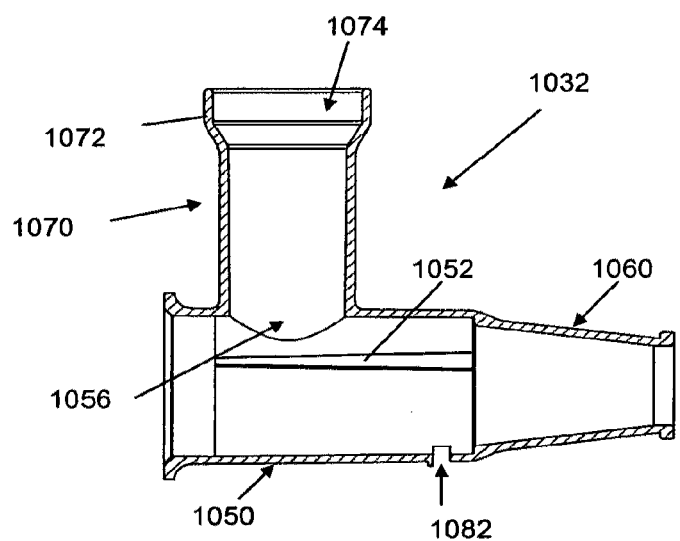
FIG. 50 is a side sectional view of the main body illustrated in FIG. 47.

Referring to FIG. 49, the hollow cylindrical portion 1050 includes two interior diametrically opposed longitudinally extending ridges 1052, 1054 that extend from a location proximate the annular flange 1040 to the hollow conical portion 1060 as exemplified by ridge 1052 illustrated in FIG. 50.

Hollow Conical Portion 1060

Figure 48:
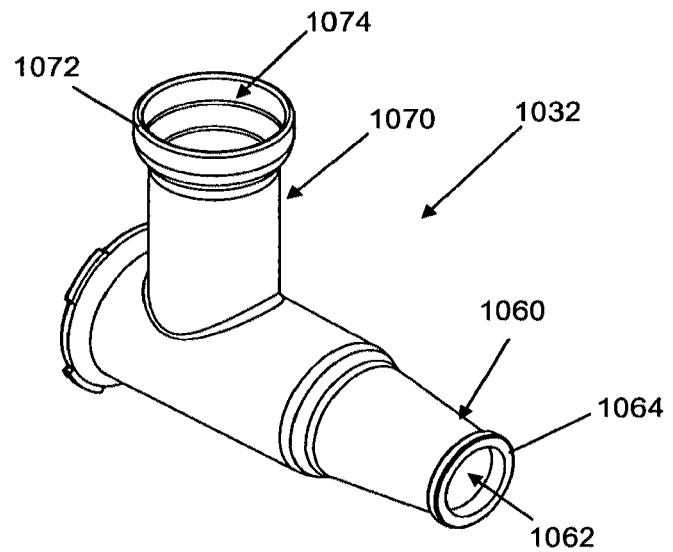
FIG. 48 is a front and side perspective view of the main body illustrated in FIG. 47.

Referring to FIG. 48, the hollow conical portion 1060 includes a circumscribing flange 1064 that defines the open front end 1062 of the main body 1032. In one embodiment, the open front end 1062 of the main body 1032 is smaller in diameter than the open back end 1042 of the main body 1032. Additionally, the inside diameter of the horizontally extending hollow cylindrical portion 1050 is slightly larger than the corresponding outside diameter of screen insert 1090 for defining a gap 1084 (FIG. 45) therebetween. Furthermore, the horizontally extending hollow conical portion 1060 is sized larger than the corresponding outside diameter of a front conical section 1114 (FIG. 52) of the screen insert 1090 for further defining the gap 1084 therebetween for allowing circumferential juice flow out of the screen insert 1090 and through the outlet 1082 to the exterior of the juicer 1010 as further delineated hereinbelow.

Hollow Feeding Tube 1070

Referring to FIGS. 48 and 50, and as noted above, the hollow feeding tube 1070 is integrally formed with and upwardly extends from the hollow cylindrical portion 1050. The hollow feeding tube 1070 is in open communication with the hollow cylindrical portion 1050 via a top opening 1056 (FIG. 50) disposed through a top of hollow cylindrical portion 1050. The upwardly extending hollow feeding tube 1070 extends from the top opening 1056 in hollow cylindrical portion 1050 and terminates to a top flange 1072 defining a feed tube opening 1074 for feeding foods into the juicer 1010. In one embodiment, the diameter of the top flange 1072 is larger than the diameter of the remaining portion of the feeding tube 1070.

Tamper 1075 and Funnel 1080

As shown in FIG. 46, and in one embodiment, a tamper 1075 is employed to assist in forcing the foods to the cutters 1140 and 1340 by pulsing or moving the tamper 1075 up and down. In one embodiment, the tamper 1075 includes a head 1076 for a user to grab when pulsing or moving the tamper 1075 up and down. The head 1076 surmounts a body 1077 which supports a stop 1078 at a medial location of the body 1077 and a bottom tamper portion 1079 at a distal portion of the body from the head 1076. The bottom tamper portion 1079 is sized to be received in the hollow feeding tube 1070 and the stop 1078 is sized larger than hollow feeding tube 1070 so as not to drop the tamper 1075 therethrough. In one embodiment, the juicer 1010 is further comprised of a funnel 1080 that surmounts the feeding tube 1070 and is sized at its lower end to operatively couple to the top flange 1072 thereof.

Outlet Slot 1082

Referring now to FIGS. 47 and 50, the outlet slot 1082 is disposed through the main body 1032 for expelling the juice that is extracted from the food. In particular, and in one embodiment, the outlet slot 1082 is an arcuate slot that runs along the bottom of the hollow cylindrical portion 1050 of the body 1032 at an angle that is transverse to a longitudinal axis of the body 1032. The transverse outlet slot 1082 is positioned between the hollow cylindrical portion 1050 and the hollow conical portion 1060 such that the action of gravity causes the extracted juice to collect at the bottom surfaces of the hollow cylindrical portion 1050 and the hollow conical portion 1060 which taper or funnel toward the transverse outlet slot 1082 to promote juice flow out of outlet 1082 and into, for example, a container below.

Screen Insert 1090

Figure 51:
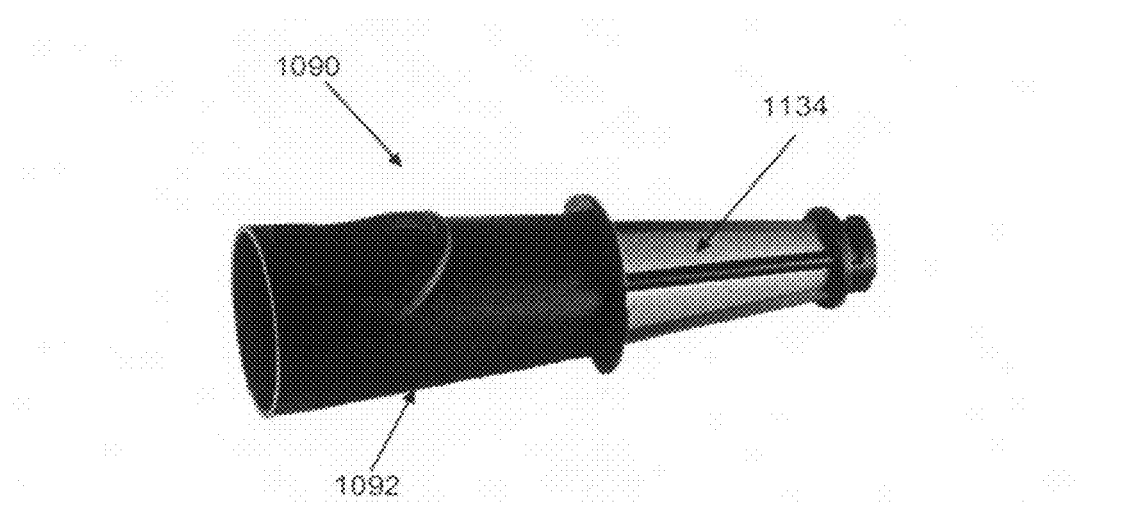
FIG. 51 is a rear and side perspective view of another embodiment of a screen insert.
Figure 52:
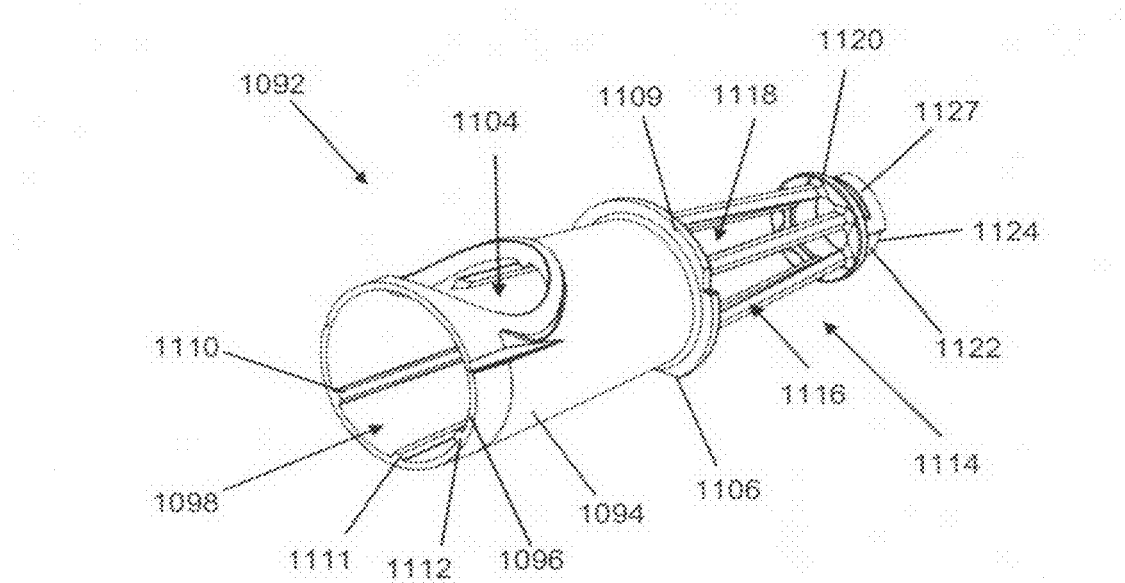
FIG. 52 is a rear and side perspective view of another embodiment of an insert member of the screen insert illustrated in FIG. 51.
Figure 53:
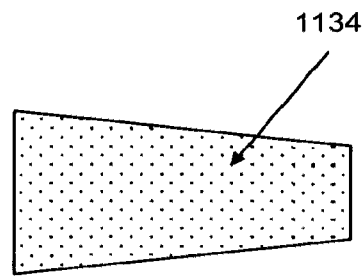
FIG. 53 is a side plan view of a screen cone of the screen insert illustrated in FIG. 51.

Referring to FIGS. 51 through 53, and in one embodiment, the screen insert 1090 is comprised of an insert member 1092 and a screen cone member 1134 manufactured as a single, unitary piece by, for example, molding the screen cone member 1134 into the insert member 1092. Alternatively, the screen insert 1090 can be manufactured as separate parts 1092 and 1134 that are removably or non-removably attached to each other.

Insert Member 1092

Referring to FIG. 52, the insert member 1092 is comprised of an open ended hollow rear cylindrical section 1094 having a rear annular lip 1096 defining rear opening 1098 of screen insert 1090. The open ended hollow rear cylindrical section 1094 transitions from the rear annular lip 1096 to a front annular edge 1100 (FIG. 56) defining a front opening 1102 of the open ended hollow rear cylindrical section 1094.

Rear Cylindrical Section 1094

An opening 1104 is formed through the top of the rear cylindrical section 1094 and is in open communication with the upwardly extending hollow feeding tube 1070 via the top opening 1056 (FIG. 50) of cylindrical portion 1050 of the main body 1032 when the screen insert 1090 properly mates with the main body 1032.

Additionally, the rear cylindrical section 1094 includes a flat 1106 that provides clearance between the interior of the main body 1032 and the screen insert 1090 at an area adjacent the transverse outlet slot 1082 to allow extracted juice to pass through the screen cone member 1134, by the flat 1106, and out of outlet 1082 and into, for example, a container below.

Referring now to FIGS. 52 and 54, the rear cylindrical section 1094 includes two exterior notches 1107, 1108 disposed in a rim 1109 circumscribing front opening 1102 (FIG. 56) of the rear cylindrical section 1094. The two exterior notches 1107, 1108 correspond to and mate with the two interior diametrically opposed longitudinally extending ridges 1052, 1054 (FIG. 49) of the hollow cylindrical portion 1050.

Figure 55:
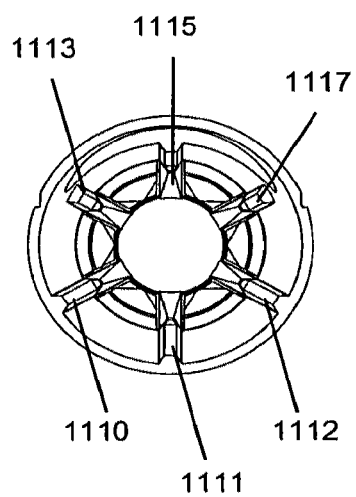
FIG. 55 is a back plan view of the insert member shown in FIG. 52.
Figure 56:
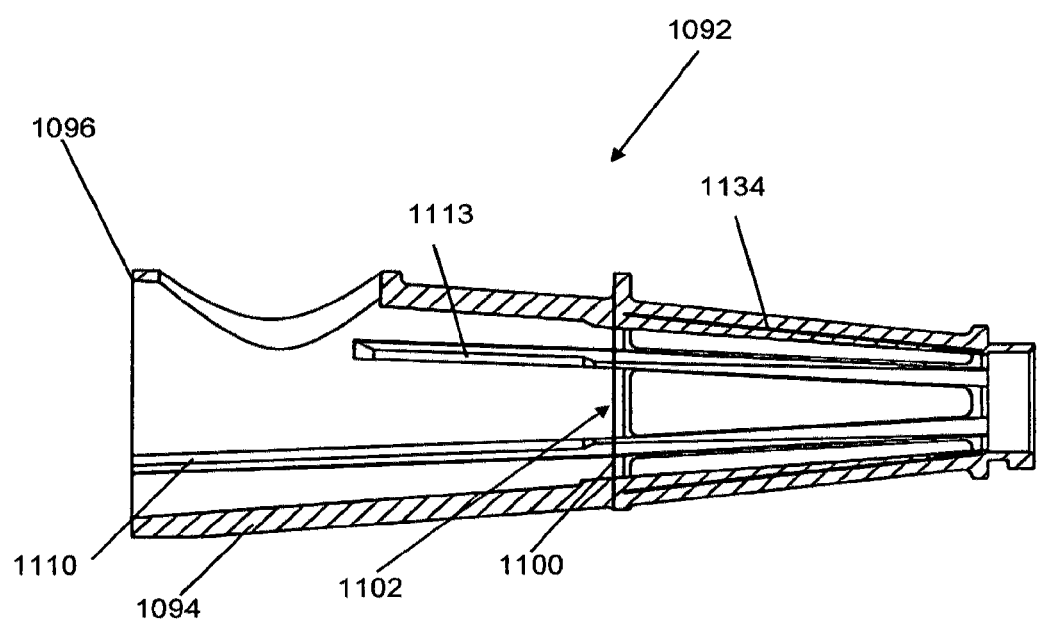
FIG. 56 is a side sectional view of the insert member shown in FIG. 52.

Furthermore, and referring to FIGS. 52 and 55, the rear cylindrical section 1094 includes three interior spaced apart longitudinally extending ribs 1110, 1111, and 1112 which interiorly extend between the rear opening 1098 and the front opening 1102 as exemplified by longitudinally extending rib 1110 illustrated in FIG. 56.

Moreover, and referring to FIGS. 52 and 55, the rear cylindrical section 1094 also includes three interior spaced apart longitudinally extending abbreviated ribs 1113, 1115, and 1117 which interiorly extend proximate opening 1104 and the front opening 1102 as exemplified by longitudinally extending rib 1110 illustrated in FIG. 56.

Front Conical Section 1114

Referring now to FIGS. 52, 54 and 55, the insert member 1092 is further comprised of the front conical section 1114 defined by a plurality of spaced apart ribs 1116 having rear and front ends. In one embodiment, there are six spaced apart ribs 1116 with each of the three lower ribs being respectively continuous with the longitudinally extending ribs 1110, 1111, and 1112 disposed within the interior of rear cylindrical section 1094 and with each of the three upper ribs being respectively continuous with the longitudinally extending abbreviated ribs 1113, 1115, and 1117 disposed within the interior of rear cylindrical section 1094 as exemplified by longitudinally extending abbreviated rib 1113 illustrated in FIG. 56.

The plurality of spaced apart ribs 1116 define windows 1118 therebetween which taper from rear ends to front ends of the ribs 1116.

At their front ends, the plurality of spaced apart ribs 1116 transition into an annular collar 1120 that radially outwardly extends from the front ends of the plurality of spaced apart ribs 1116.

The annular collar 1120 forwardly steps down and transitions into a hollow annular rim 1122 which terminates to a front circular edge 1124 defining the open outer end or discharge opening 1130 for the expulsion of solids such as pulp, homogenized, or shredded material.

Figure 64:
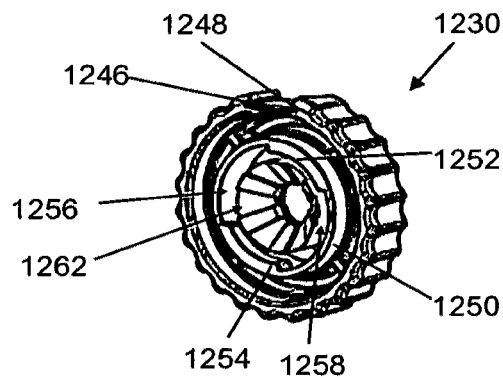
FIG. 64 is a rear and side perspective view of the restrictor coupling illustrated in FIG. 63.
Figure 65:
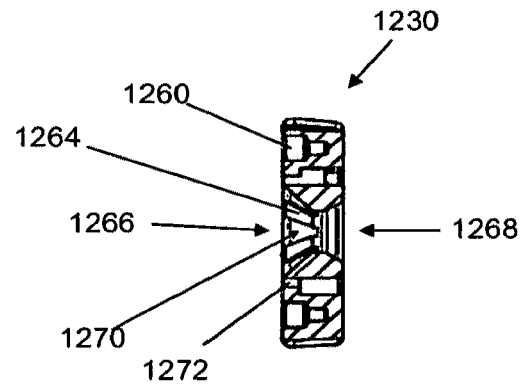
FIG. 65 is a side sectional view of the restrictor coupling illustrated in FIG. 63.

Two spaced apart L-shaped protrusions 1127, 1128 disposed on an exterior surface of the annular rim 1122 form two spaced apart L-shaped notches 1131, 1132 that receive two complementarily shaped tabs 1252, 1254 (FIG. 64) disposed on an interior surface of a restrictor coupling 1230.

Screen Cone Member 134

Referring to FIGS. 51 through 53, the screen insert 1090 further includes the open ended screen cone member 1134 which is formed with or fitted into the front conical section 1114 of insert member 1092 for closing the windows 1118 formed by the plurality of spaced apart ribs 1116. Additionally, and in one embodiment, the screen cone member 1134 is an open ended, screen sided conical cone made of stainless steel. Furthermore, the screen insert 1090 can be manufactured by molding the rear cylindrical section 1094 separately or in combination with the front conical section 1114. Moreover, the screen cone member 1134 can be molded into the front conical section 1114 or coupled thereto after the screen cone member 1134 has been molded. Thus, the screen insert 1090 can be manufactured in multiple pieces coupled to each other or as a single, unitary piece.

Greens Auger/Cutter 1140

Referring to FIG. 46, and as noted above, an embodiment of the greens juicing configuration 1030 is further comprised of the greens auger or cutter 1140 which is sized to fit inside screen insert 1090.

Figure 57:
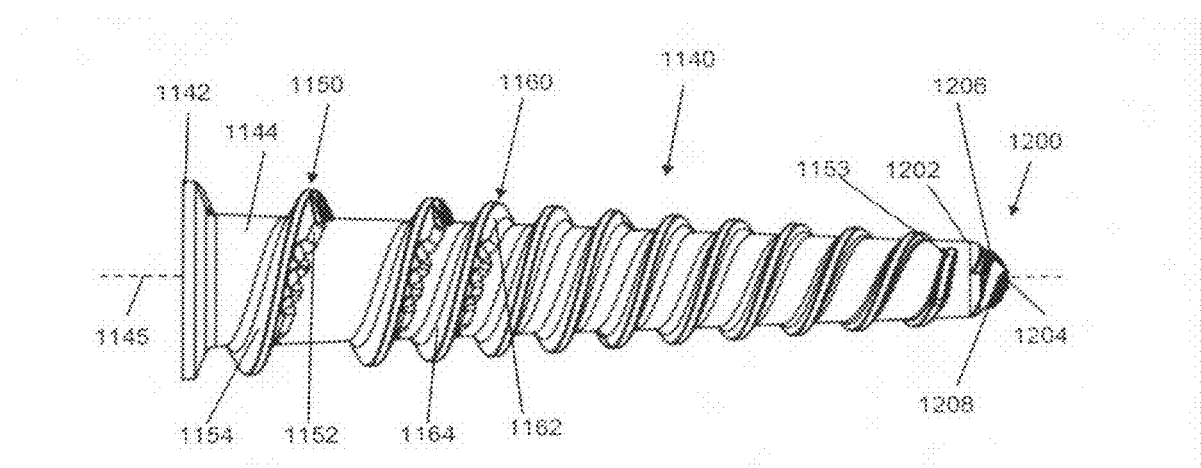
FIG. 57 is a side elevational view of another embodiment of a greens cutter or auger.

Referring now to FIG. 57, and in one embodiment, the greens auger or cutter 1140 includes a circular rear base 1142 transitioning into an elongated tapered body 1144 extending along a central longitudinal axis 1145 and terminating to a front tapered nose section 1200 having a flat tip 1204. The elongated tapered body 1144 is defined by a circular cross section having a diameter tapering from the circular rear base 1142 to the front tapered nose section 1200 of the greens auger or cutter 1140. In one embodiment, the front tapered nose section 1200 has a taper that is greater than that of the elongated tapered body 1144. In other words, the angle of declination of the front tapered nose section 1200 is greater than the angle of declination of the elongated tapered body 1144.

Figure 58:
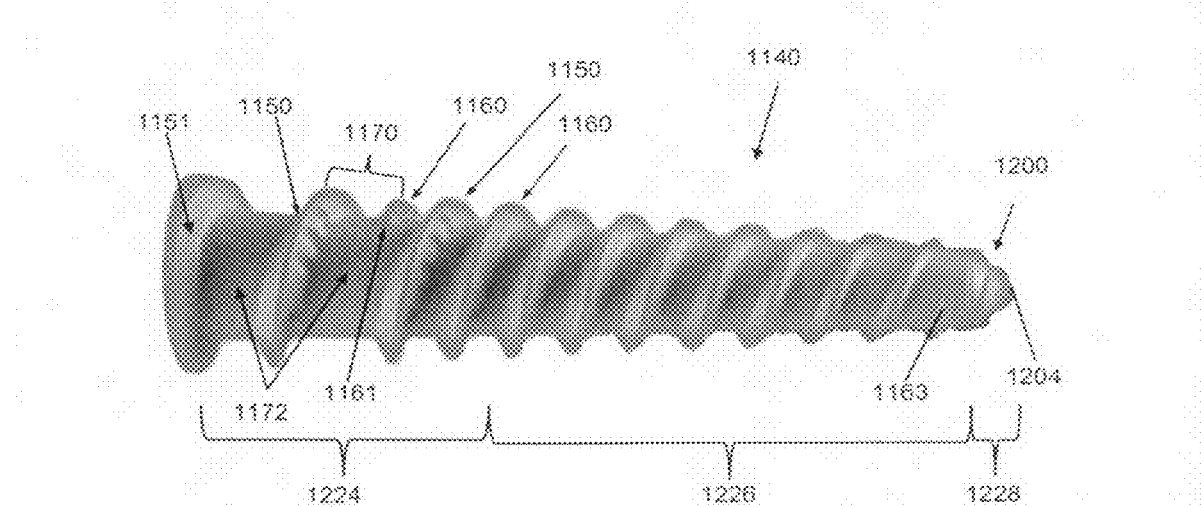
FIG. 58 is another side elevational view of the greens cutter or auger illustrated in FIG. 57.

Referring now to FIGS. 57 and 58, and in one embodiment, the greens auger 1140 is formed with two projecting helical ribs defined by a first helical rib 1150 and a second helical rib 1160 arranged with their phases 1170 equidistantly shifted respectively about the elongated tapered body 1144 and tapering with the taper of the body 1144 of the auger 1140. In one particular embodiment, the first helical rib 1150 and the second helical rib 1160 are arranged with their phases equidistantly shifted one-hundred eighty degrees from each other about the elongated tapered body 1144 of the auger 1140.

Additionally, the first helical rib 1150 starts from the circular rear base 1142 of the elongated tapered body 1144 at a start location 1151 and ends prior to and adjacent the front tapered nose section 1200 at an end location 1153.

The second helical rib 1160 starts after an initial one and one-quarter revolutions of the first helical rib 1150 at a start location 1161 so that the elongated tapered body 1144 is devoid of one and one-quarter revolutions of the second helical rib 1160 between the circular rear base 1142 of the elongated tapered body 1144 and start location 1161 of said second helical rib for defining a feed region 1172 of the elongated tapered body 1144 that is devoid of the second helical rib 1160 and that is in open communication with or registered with the sidewall feed opening 1104 (FIG. 52) of the screen insert 1090 and the hollow feeding tube or throat 1070 of the main body 1032. The second helical rib 1160 ends prior to and adjacent the front tapered nose section 1200 at an end location 1163

The first and second helical ribs 1150, 1160 also respectively include a front or leading side 1152, 1162 and a rear or trailing side 1154, 1164 thereby defining the front side 1152 of the first helical rib 1150 as the first front side 1152 and the front side 1162 of the second helical rib 1160 as the second front side 1162.

Dimples 1180

Figure 59:
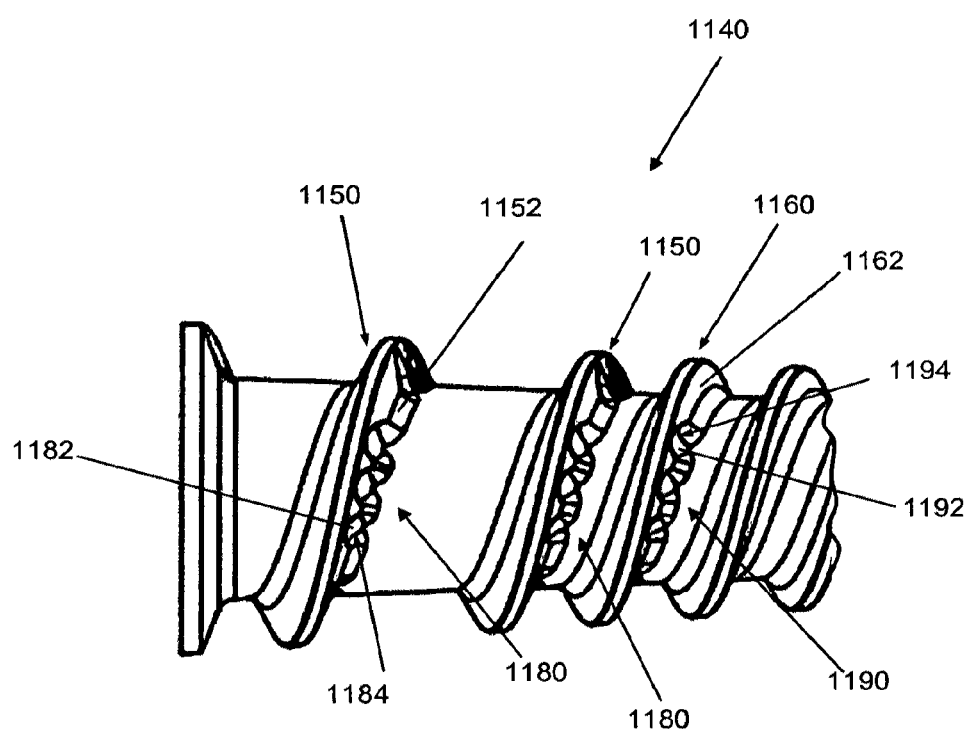
FIG. 59 is a fragmentary side elevational view of the greens cutter or auger illustrated in FIG. 57.

Referring to FIG. 59, and in one embodiment, the first helical rib 1150 is comprised of a plurality of dimples 1180 disposed on a portion of the first front side 1152 of the first helical rib 1150 or, in other words, on a portion of the first helical rib 1150 between the root and crest of the first helical rib 1150.

In one embodiment, each of the plurality of dimples 1180 are formed by a tear dropped shaped concave surface 1182 having a ridge 1184 surrounding the concave surface 1182.

When the juicer 1010 is assembled in the greens juicing configuration 1030, the plurality of dimples 1180 are in open communication with or registered with the sidewall feed opening 1104 of the screen insert 1090 and the hollow feeding throat 1070 of the main body 1032 for gripping food material feed through throat 1070 and feed opening 1104.

As illustrated in FIGS. 57 and 58, and in one embodiment, the plurality of dimples 1180 are disposed in a plurality of spaced apart groups of three for about the first two and one-quarter turns of the first helical rib 1150 wherein this pattern starts after about a one-quarter turn from the start location 1151 of the first helical rib 1150.

Referring again to FIG. 59, and in one embodiment, the second helical rib 1160 is comprised of a plurality of dimples 1190 disposed on a portion of the second front side 1162 of the second helical rib 1160 or, in other words, on a portion of the second helical rib 1160 between the root and crest of the second helical rib 1160.

In one embodiment, each of the plurality of dimples 1190 are formed by a tear dropped shaped concave surface 1192 having a ridge 1194 surrounding the concave surface 1192.

When the juicer 1010 is assembled in the greens juicing configuration 1030, the plurality of dimples 1190 disposed on the portion of the second front side 1162 of the second helical rib 1160 are in in open communication with or registered with the sidewall feed opening 1104 of the screen insert 1090 and the hollow feeding throat 1070 of the main body 1032 for gripping food material feed through throat 1070 and the feed opening 1104.

As illustrated in FIGS. 57 and 58, and in one embodiment, the plurality of dimples 1190 are disposed in a plurality of spaced apart groups of three for about an initial three-quarters of a turn of the second helical rib 1160 wherein this pattern starts just after or proximate to the start location 1161 of the second helical rib 1160.

Front Tapered Nose Section 1200

With reference to FIG. 57, and as noted above, the front tapered nose section 1200 of the greens auger 1140 has a taper that is greater than that of the elongated tapered body 1200 and tapers from a back end 1202 to the flat front tip 1204. As seen in FIG. 57, the back end 1202 of the front tapered nose section 1200 also serves as the front end of the elongated tapered body 1144.

Figure 60:
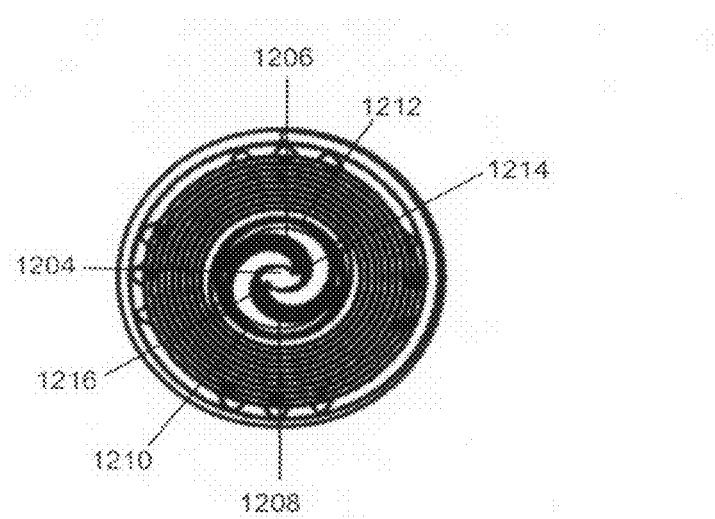
FIG. 60 is a front plan view of the greens cutter or auger illustrated in FIG. 57.

Now with reference to FIGS. 57 and 60, the front tapered nose section 1200 is formed with two projecting helical or spiral ribs 1206, 1208 that respectively comprise opposing back ends 1210, 1212 that are disposed adjacent the back end 1202 of the front tapered nose section 1200 and that are spaced about one hundred eighty degrees apart.

The two projecting helical ribs 1206, 1208 helically wind around the front tapered nose section 1200 from their opposing back ends 1210, 1212 at back end 1202 to the flat front tip 1204 where they respectively terminate to opposing front ends 1214, 1216 which are also spaced about one hundred eighty degrees apart.

Blind Bore 1218

Figure 61:
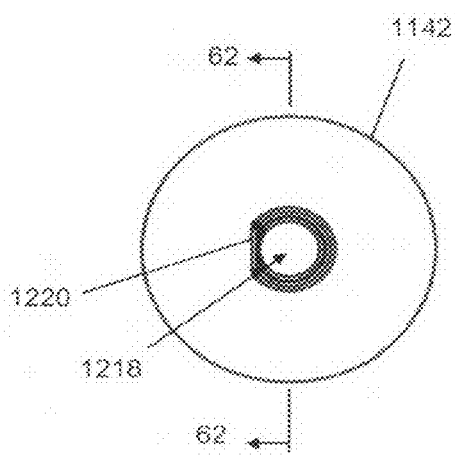
FIG. 61 is a back plan view of the greens cutter or auger illustrated in FIG. 57.
Figure 62:
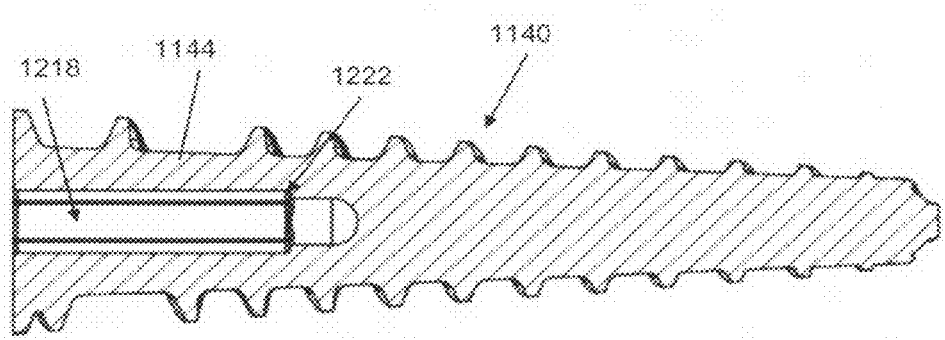
FIG. 62 is a side sectional view of the greens cutter or auger taken along line 62-62 of FIG. 61.
Figure 63:
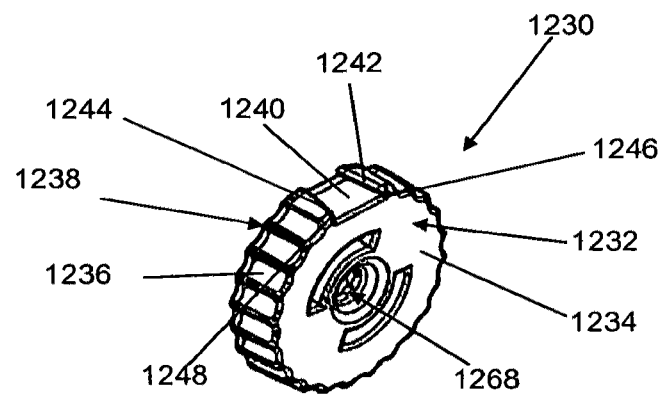
FIG. 63 is a side and front perspective view of a restrictor coupling.

Referring now to FIGS. 61 and 62, and in one embodiment, the circular rear base 1142 has blind bore 1218 that extends therethrough and into the elongated tapered body 1144 as shown in FIG. 62.

The blind bore 1218 includes a flat side 1220 and is sized and shaped to accommodate motor shaft 24.

Near the end of the blind bore 1218 is an internal step 1222, which engages against the end of motor shaft 24 for proper linear positioning of the greens auger 1140.

Auguring Sections 1224, 1226, and 1228

Now with reference to FIG. 57, and in light of the above detailed description, the greens auger or cutter 1140 comprises a rear spiral grabbing and auguring section 1224 which is about one-third the total length of greens auger or cutter 1140, a medial/main spiral auguring section 1226, and a front spiral auger nose section 1228 which is tapered at about a 45 degree angle.

Restrictor Coupling 1230

As noted above, and referring to FIGS. 46, 63, 64, and 65, the greens juicing configuration 1030 further includes the restrictor coupling 1230 received over the discharge opening 1130 of the screen insert 1090 and operatively coupled to the screen insert 1090 adjacent the discharge opening 1130 of the screen insert 1090.

In one embodiment, the restrictor coupling 1230 is comprised of a short cylindrically shaped body 1232 comprising a generally flat front face 1234 having an outer periphery that transitions into a rearwardly extending annularly shaped outer sidewall 1236 having a circumscribing ribbed portion 1238. The annularly shaped outer sidewall 1236 includes a notched section 1240 having upwardly and inwardly extending sidewalls 1242, 1244 forming a pair of spaced apart interior sidewall grooves 1246, 1248 above and to the sides of the notched section 1240.

Additionally, the cylindrically shaped body 1232 is comprised of an inner annular flange portion 1250 that rearwardly extends from the flat front face 1234 of the body 1232 and that is radially inwardly spaced from and circumscribed by the annularly shaped outer sidewall 1236 wherein a first circular channel 1260 is formed between the annularly shaped outer sidewall 1236 and the inner annular flange portion 1250 for receipt of circumscribing flange 1064 of the body 1032. The inner annular flange portion 1250 comprises a pair of diametrically opposed and arcuate shaped tabs 1252, 1254 that radially inwardly extend from an inner and upper peripheral edge of the inner annular flange portion 1250 thereby forming a pair of diametrically opposed and arcuate shaped notches 1256, 1258.

Furthermore, the cylindrically shaped body 1232 is comprised of a hollow cylindrical central portion 1262 that rearwardly extends from the flat front face 1234 of the body 1232 and that is radially inwardly spaced from and circumscribed by the inner annular flange portion 1250 wherein a second circular channel 1272 is formed between the inner annular flange portion 1250 and the hollow cylindrical central portion 1262 for receipt of annular rim 1122 of the insert 1092.

The hollow cylindrical central portion 1262 is comprised of interior conical wall 1264 that tapers from a central rear opening 1266 to a central front discharge opening 1268. The interior conical wall 1264 is complemental in shape to receive the front tapered nose section 1200 and includes a plurality of spaced apart ribs 1270 which interact or coact with the two projecting helical ribs 1206, 1208 on the front spiral auger nose section 1228 for providing further food compression and juice extraction when in use and operation.

The restrictor coupling 1230 is operatively coupled to the screen insert 1090 by simply aligning and pushing the respective tabs 1252, 1254 into the two spaced apart base branch notches of the L-shaped notches 1131, 1132 of the screen insert 1090 and twisting the restrictor coupling 1230 counterclockwise. This twisting motion locates the pair of diametrically opposed and arcuate shaped tabs 1252, 1254 of the restrictor coupling 1230 into the two apart spaced branch notches of the L-shaped notches 1131, 1132 which are perpendicular to the base branch notches noted above thereby respectively locating the arcuate shaped tabs 1152, 1154 behind the perpendicular branches of the two spaced apart and horizontally flipped L-shaped protrusions 1127, 1128 of the screen insert 1090.

Deflector 1280

An optional deflector 1280 operatively couples to the restrictor coupling 1230 adjacent the central front discharge opening 1268 thereof.

Figure 66:
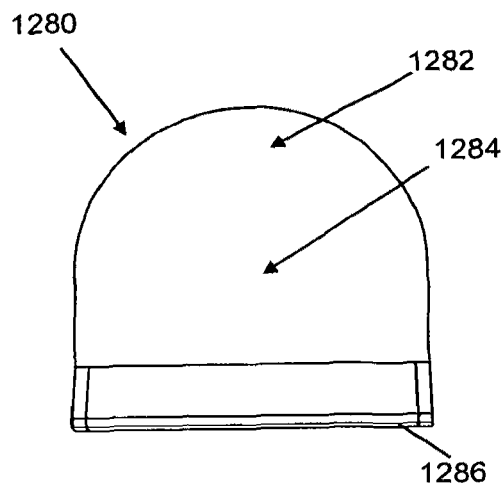
FIG. 66 is a front plan view of another embodiment of a deflector.
Figure 67:
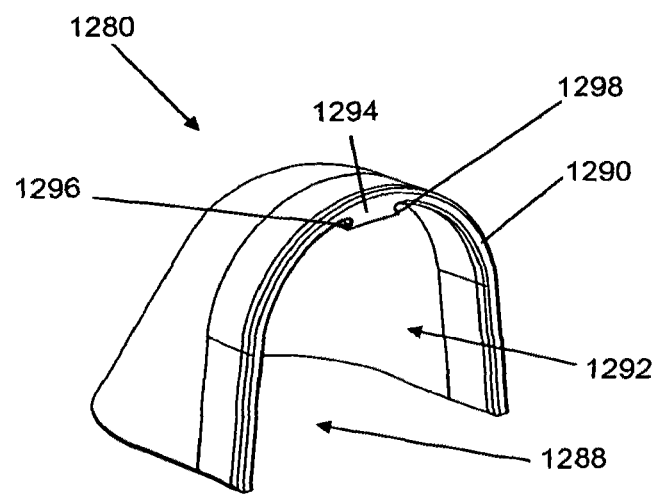
FIG. 67 is a side and rear perspective view of the deflector illustrated in FIG. 66.

Referring to FIGS. 66 and 67, and in one embodiment, the deflector 1280 includes a curved top wall 1282 transitioning into a downwardly and forwardly diverging arcuate front wall 1284 terminating to a flat bottom periphery 1286 defining a parabolic shaped bottom opening 1288. The curved top wall 1282 and the arcuate front wall 1284 rearwardly extend to an inverted U-shaped flat back edge 1290 defining an inverted U-shaped opening 1292. An inverted downwardly extending T-shaped tab 1294 is disposed at the apex or arcuate portion of the inverted U-shaped flat back edge 1290 and includes a pair of radially outwardly extending members 1296, 1298. The pair of radially outwardly extending members 1296, 1298 forwardly extends and outwardly diverges from the inverted U-shaped flat back edge 1290 toward the arcuate front wall 1284.

The deflector 1280 is attached to the restrictor coupling 1230 by sliding the inverted downwardly extending T-shaped tab 1294 of the deflector 1280 into the notched section 1240 of the restrictor coupling 1230 such that the radially outwardly extending members 1296, 1298 of inverted downwardly extending T-shaped tab 1294 mate with the pair of spaced apart internal sidewall grooves 1246, 1248 of the notched section 1240 thereby allowing the deflector 1280 to act as a shield and to guide solid discharged food downward into a container for ease of collection and to minimize the possibility of solids flying out of the juicer during high-speed operations. The forwardly extending and outwardly diverging taper of the T-shaped tab 1294 longitudinally positions the deflector 1280 relative to the restrictor coupling 1230 and, as a result, the longitudinal positioning of the deflector 1280 relative to the main body 1032 is also achieved.

Motor Control System 1300

Figure 68:
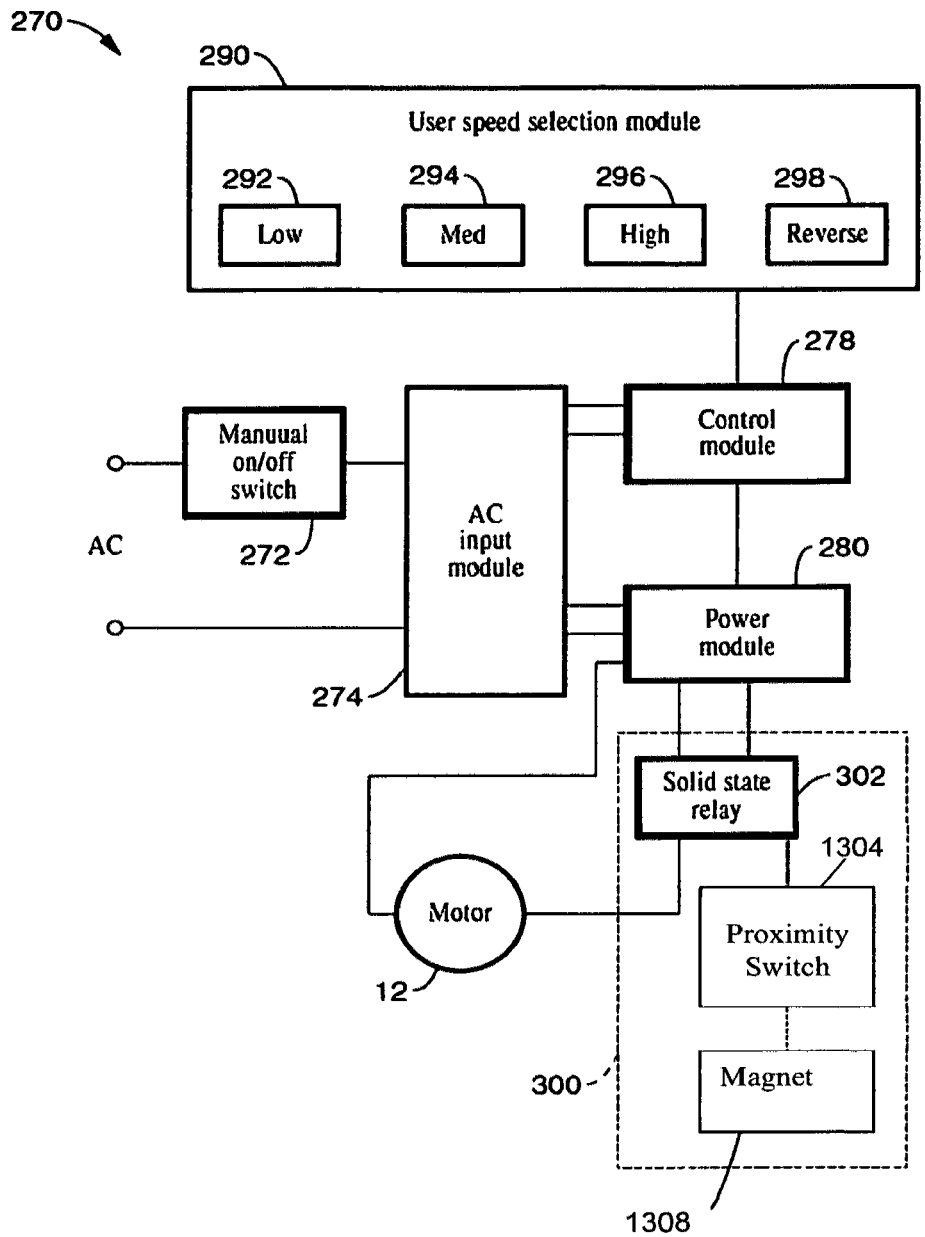
FIG. 68 is a block diagram view of the motor control system including another embodiment of a safety switch system.

Referring to FIG. 68, and in one embodiment, the juicer 1010 further comprises a motor control system 1300 which is identical to the motor control system 270 delineated in detail above and illustrated in FIG. 27 which two exceptions.

First, the motor control system 1300 replaces the safety micro switch 304 having push button 303 illustrated in FIG. 27 with the proximity (Reed) switch 1304 illustrated in FIG. 67. Second, the motor control system 1300 replaces the safety projection 100, 500, or 600 illustrated in FIG. 27 with the embedded magnet 1308 which is illustrated in FIG. 67 and previously delineated hereinabove. Accordingly, a new safety switch system or means 1310 is obtained with the solid state relay 302 still operatively coupled between the power module 280 and the motor 12, but now with the proximity switch 1304 operatively coupled to the solid state relay 302 and with the magnet 1308 operatively coupled to the proximity switch 1304 in place of the micro switch 304 and safety projection 100, 500, or 600 coupling.

In one embodiment, the proximity switch 1304 is mounted on an inside surface of the hub 1020 (FIG. 45) and the magnet 1308 is embedded in the rear annular flange 1040 of the main body 1032 (FIG. 47) thereby precluding the juicer 1010 from being operated unless the body 1032 is properly attached to the hub 1020. With the body 1032 properly attached to the hub 1020, the embedded magnet 1308 causes the proximity switch 1304 to close thereby activating the solid state relay 302 to send current to the motor 12 via the power module 280 for energizing the juicer 1010. Thus, when the manual switch 272 is in the on position, a voltage will be provided to the solid state relay, but current will not flow through the solid state relay 302 and the motor 12 will not be energized until the main body 1032 is properly attached or operatively coupled to the hub 1020 such that the embedded magnet 1308 in the rear annular flange 1040 addresses the proximity switch 1304.

Use and Operation of Greens Juicing Configuration 1030

The use and operation of juicer 1010 in greens juicing configuration 1030 is analogous to the above delineated use and operation of juicer 10 in greens juicing configuration 30. In particular, the user first assembles the components shown in FIG. 46 to the motor shaft 24 and hub 1020 shown in FIG. 45. Now referring to FIGS. 45 through 68, the assembly is accomplished in one manner by sliding the greens auger or cutter 1140 onto motor shaft 24 and then inserting the screen insert 1090 through the open back end of the main body 1032. Next, the main body 1032, with the screen insert 1090 inserted therein, is placed over the greens cutter 1140 and connected to the hub 1020 by lining up the cut-out notches 1044 on the annular flange 1040 with the corresponding in turned ears 1028 on the hub 1020 and then linearly translating the main body 1032 with screen insert 1090 therein towards the hub 1020 and finally turning the main body 1032 and screen insert 1090 counterclockwise for allowing the annular flange 1040 to slide under the in-turned ears 1028 until the radial stop 1047 come in contact with the lowermost in-turned ear for providing a locking connection. The restrictor coupling 1230 is then operatively coupled to the screen insert 1090 as delineated above. Deflector 1280, which is optional, is then slid into notched section 1240 of the restrictor coupling 1230 as detailed above. A container is placed below juice outlet 1082 to collect the juice and another container is placed below deflector 1280 to collect the expelled solids which are typically discarded.

Once assembled, a speed is selected via user speed selection module 290 and the juicer 1010 is turned on via manual on/off switch 272. Typically, and in one embodiment, a low speed is selected for the greens juicing configuration 1030. Next, food is placed into the feeding tube 1070 via feed tube opening 1074 and tamper 1075 is employed to assist in forcing the food to the auger or cutter 1140 by pulsing or moving the tamper 1075 up and down. The food passes through opening 1104 in screen insert 1090 and makes contact with the grabbing and auguring section 1224 comprising the feed region 1172 of the greens auger or cutter 1140 and the dimples 1180, 1190 respectively disposed on the front or leading sides of ribs 1150, 1160. The dimples 1180, 1190 promote the grabbing of the food while the rotating ribs 1150, 1160 also function both as a cutter and an auger for cutting the food and pushing it forward along the length of both the grabbing and auguring section 1224 and the medial auguring section 1226 to the front spiral auger nose section 1228. The cut food is squeezed or compressed between ribs 1110, 1111, 1112, 1113, 1115, and 1117 of screen insert 1090 and greens auger or cutter 1140 to extract the juice. The juice is circumferentially forced out screen cone member 1134 by way of windows 1118 and circulates around the outside of screen insert 1090.

Furthermore, the plurality of spaced apart ribs 1270 disposed on the interior conical wall 1264 of the restrictor coupling 1230 interact or coact with the front spiral auger nose section 1228 for providing further food compression and juice extraction. The action of gravity causes the extracted juice to collect at the bottom surfaces of the hollow cylindrical portion 1050 and the hollow conical portion 1060 which taper or funnel toward outlet 1082 to promote juice flow out of outlet 1082 and into, for example, a container below. The solid material does not pass out screen cone member 1134, but is forced forward through the central front discharge opening 1268 of restrictor coupling 1230 for a restricted discharge thereof which is downwardly deflected by deflector 1280 into, for example, a container below.

Disassembly of the greens juicing configuration 1030 can be accomplished by reversing the above assembly steps.

Vegetable Juicing Configuration 1330

Figure 69:
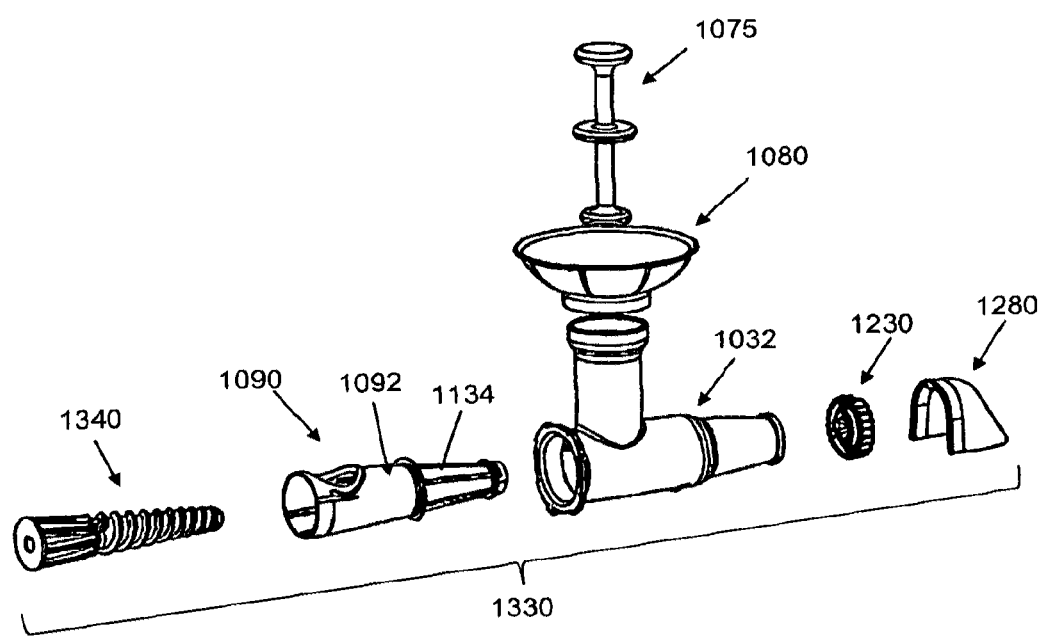
FIG. 69 is an exploded parts perspective view of another embodiment of vegetable juicing configuration.

FIG. 69 shows an exploded parts perspective view of the vegetable juicing configuration 1330 of the juicer 1010 for preferably juicing hard vegetables, such as carrots or beets. Vegetable juicing configuration 1330 is comprised of a grinding cutter 1340, the screen insert 1090, the main body 1032, the restrictor coupling 1230, and the optional deflector 1280.

The screen insert 1090, the main body 1032, the restrictor coupling 1230, and the optional deflector 1280 are as delineated in detail hereinabove.

Grinding Cutter 1340

Figure 70:
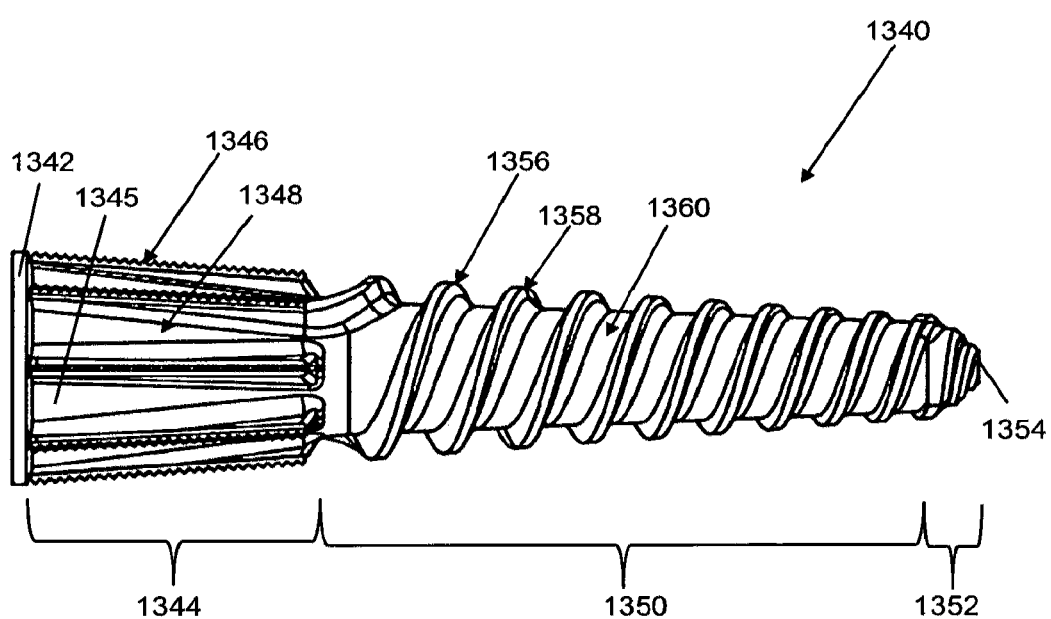
FIG. 70 is a side plan view of another embodiment of a grinding cutter or auger.
Figure 71:
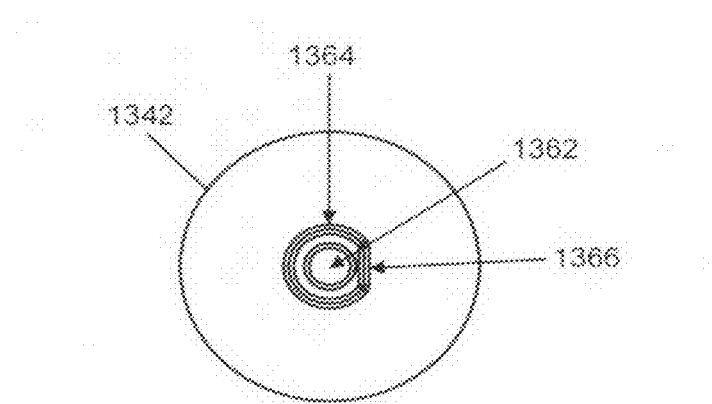
FIG. 71 is a rear plan view of the grinding cutter or auger illustrated in FIG. 70.
Figure 72:
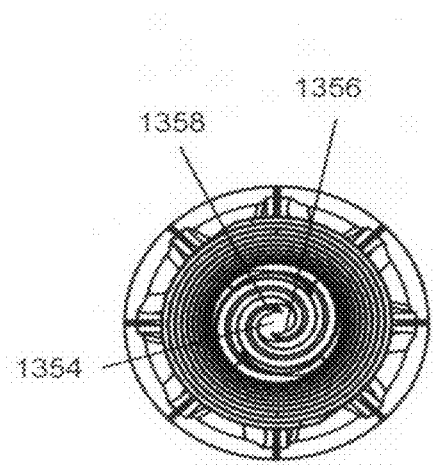
FIG. 72 is a front plan view of the grinding cutter or auger illustrated in FIG. 70.

As shown in FIGS. 70 through 72, the grinding cutter 1340 is comprised of rear base 1342 transitioning into an elongated body or member having a cutting portion 1344, a spiral auger portion 1350, and a front spiral auger nose portion 1352. The cutting portion 1344 is comprised of a forwardly tapered body 1345 formed with a plurality of substantially parallel saw toothed cutting blades 1346 disposed in rearwardly tapered blade bodies 1347. The saw toothed cutting blades 1346 longitudinally extend along the forwardly tapered body 1345 or cutting portion 1344 and are circumferentially spaced apart from one another. The rearwardly tapered blade bodies 1347 forwardly diverge forming forwardly tapered grooves 1348 therebetween. The grooves 1348 slope downwardly from the base 1342 along the length of the forwardly tapered body 1345 or cutting portion 1344 to promote food flow.

Cutting portion 1344 has, in one embodiment, a length of about one-third the total length of grinding cutter 1340 and includes eight blades 1346, although a greater or lesser number of blades 1346 may be used. Blades 1346 are preferably made of stainless steel.

The grinding cutter 1340 further includes the spiral auger portion 1350 forwardly transitioning from the cutting portion 1344 and longitudinally extending to the front spiral auger nose portion 1352 that terminates to a flattened tip 1354. In one embodiment, the front spiral auger nose portion 1352 is tapered at about a 45 degree angle. The spiral auger portion 1350 is formed by two projecting helical ribs 1356, 1358 which start at opposing first ends which are spaced apart about one hundred eighty degrees and which are immediately adjacent the cutting portion 1344 and which continue along up to the front spiral auger nose portion 1352 where they terminate to seconds ends. The two projecting helical ribs 1356, 1358 form grooves 1360 therebetween.

A blind bore 1362 extends through the base 1342 forming a circular opening 1364 with a flat side 1366 and continues through the cutting portion 1344 and partially through the spiral auger portion 1350.

The cross-section of the blind bore 1362 is sized and shaped to accommodate motor shaft 24. Near the end of the bore 1362 is an internal step which is analogous to that which is shown in FIG. 62 and which engages against the end of motor shaft 24 for proper linear positioning of grinding cutter 1340 thereon.

Grinding cutter 1340 is sized to fit inside screen insert 1090 or homogenizing/closed window insert 1490 that is delineated in detail below.

With reference to FIGS. 70 and 72, the front spiral auger nose portion 1352 of the grinding cutter 1340 has a taper that is greater than that of the elongated tapered body of the spiral auger portion 1350 and tapers from a back end to the flat front tip 1354. As seen in FIG. 70, the back end of the front spiral auger nose portion 1352 also serves as the front end of the spiral auger portion 1350.

The front spiral auger nose portion 1352 is formed with two projecting helical ribs 1356, 1358 that respectively comprise opposing back ends that are disposed adjacent the back end of the front spiral auger nose portion 1352 and that are spaced about one hundred eighty degrees apart.

The two projecting helical ribs 1356, 1358 helically wind around the front spiral auger nose portion 1352 from the back end to the flat front tip 1354 where they respectively terminate to opposing front ends which are also spaced about one hundred eighty degrees apart.

Use and Operation of Vegetable Juicing Configuration 1330

The use and operation of juicer 1010 in the vegetable juicing configuration 1330 is analogous to the use and operation of the greens juicing configuration 1030 delineated hereinabove with the exception of using the grinding cutter 1340 in place of the greens cutter 1140. Hence, the user first assembles the components shown in FIG. 69 to the motor shaft 24 and hub 1020 shown in FIG. 45 in a similar fashion described hereinabove for the greens juicing configuration 1030.

Once assembled, the juicer 1010 is turned on via manual on/off switch 272 and a speed is selected via user speed selection module 290. Typically, and in one embodiment, a high speed is selected of about 1725 rpm for juicing hard vegetables.

Next, food is placed into the feeding tube 1070 via feed tube opening 1074 and tamper 1075 is employed to assist in forcing the food to the grinding cutter 1340 by pulsing or moving the tamper 1075 up and down. The food passes through opening 1104 in screen insert 1090 makes contact with cutting portion 1344 of grinding cutter 1340 wherein the food is cut and pushed forward to auger portion 1350. The cut food is squeezed or compressed between ribs 1110, 1111, 1112, 1113, 1115, and 1117 of screen insert 1090 and grinding cutter 1340 to extract the juice. The juice is circumferentially forced out screen cone member 1134 by way of windows 1118 and circulates around the outside of screen insert 1090.

Furthermore, the plurality of spaced apart ribs 1270 disposed on the interior conical wall 1264 of the restrictor coupling 1230 interact with the front spiral auger nose section 1352 for providing further food compression and juice extraction.

The action of gravity causes the extracted juice to collect into at the bottom surfaces of the hollow cylindrical portion 1050 and the hollow conical portion 1060 which taper or funnel toward outlet 1082 to promote juice flow out of outlet 1082 and into, for example, a container below.

The solid material does not pass out screen cone member 1134, but is forced forward through the central front discharge opening 1268 of restrictor coupling 1230 for a restricted discharge thereof which is downwardly deflected by deflector 1280 into, for example, a container below.

Disassembly of the vegetable juicing configuration 1330 can be accomplished by reversing the assembly steps.

Homogenizing Configuration 1430

Figure 73:
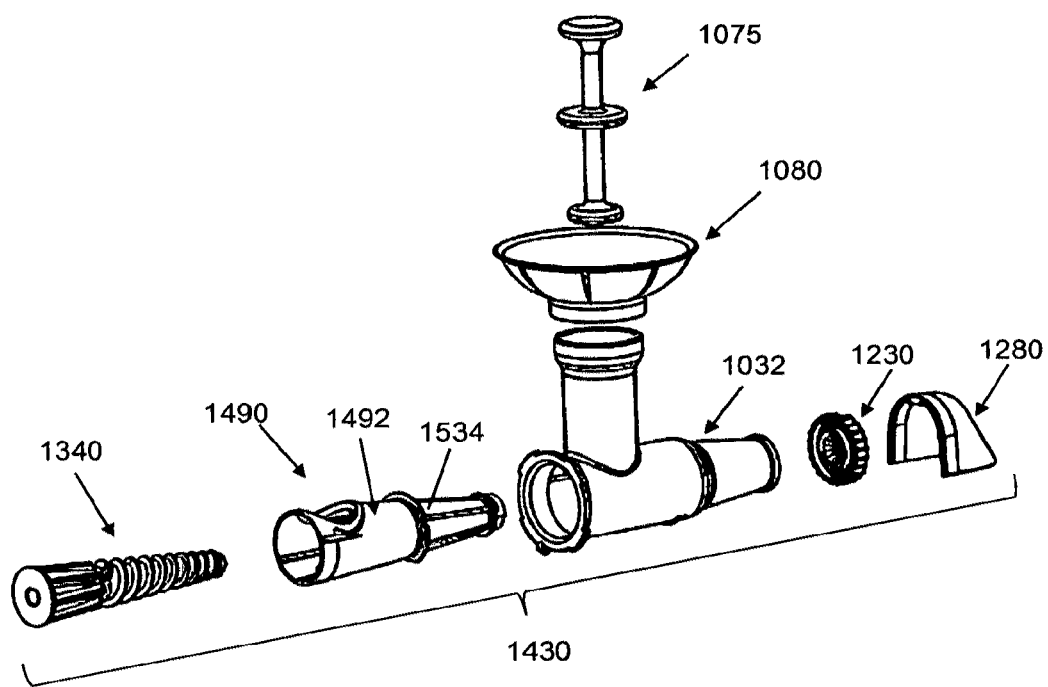
FIG. 73 is an exploded parts perspective view of another embodiment of a homogenizing configuration.

FIG. 73 shows an exploded parts perspective view of the homogenizing configuration 1430 of the juicer 1010 for preferably preparing foods such as baby food, sauces, sorbets, nut butters, and purees. The homogenizing configuration 1430 includes grinding cutter 1340, homogenizing insert 1490, main body 1032, restrictor coupling 1230, and optional deflector 1280.

Grinding cutter 1340, main body 1032, restrictor coupling 1230, and optional deflector 1280 are as delineated in detail hereinabove.

Homogenizing or Closed Window Insert 1490

Figure 74:
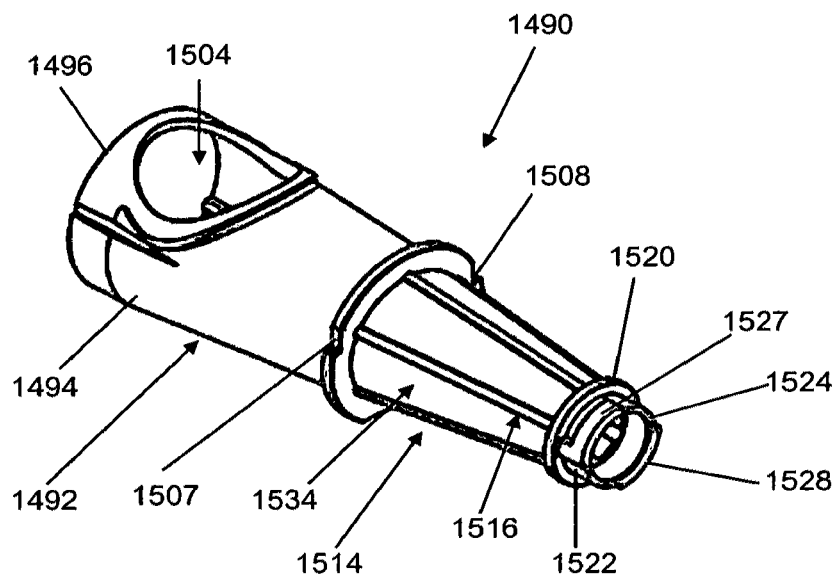
FIG. 74 is a side and front perspective view of a homogenizing insert of the homogenizing configuration illustrated in FIG. 73.

As shown in FIG. 74, homogenizing or closed window insert 1490 is identical to screen insert 1090 with the exception that homogenizing insert 1490 replaces the screen cone member 1134 of the screen insert 1090 with an open ended closed sided cone member 1534. In one embodiment, the homogenizing insert 1490 is comprised of a homogenizing insert member 1492 and the open ended closed sided cone member 1534 manufactured as a single, unitary piece. Alternatively, insert member 1492 and the open ended closed sided cone member 1534 can be manufactured as separate parts that are removably or non-removably attached to each other.

Homogenizing Insert Member 1492

Figure 75:
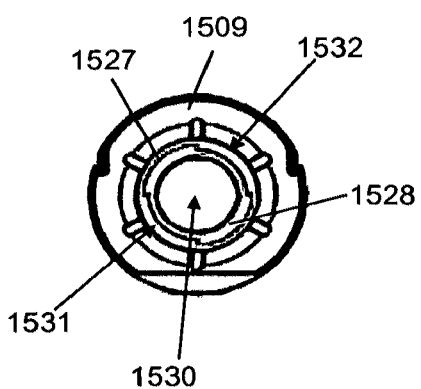
FIG. 75 is a front plan view of the homogenizing insert illustrated in FIG. 74.
Figure 76:
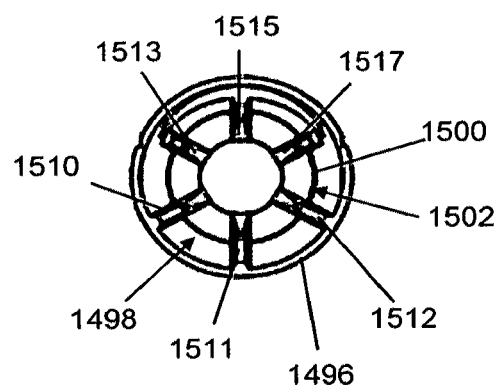
FIG. 76 is a back plan view of the homogenizing insert illustrated in FIG. 74.

Referring now to FIGS. 74 through 76, the insert member 1492 is comprised of an open ended hollow rear cylindrical section 1494 having a rear annular lip 1496 defining a rear opening 1498 of homogenizing insert 1490. The open ended hollow rear cylindrical section 1494 transitions from the rear annular lip 1496 to a front annular edge 1500 (FIG. 76) defining a front opening 1502 of the open ended hollow rear cylindrical section 1494. In turn, the front annular edge 1500 transitions into a front conical section 1514 having a front discharge opening 1530 of the insert member 1492.

Rear Cylindrical Section 1494

Still referring to FIGS. 74 through 76, an opening 1504 is formed through the top of the rear cylindrical section 1494 and is in open communication with the upwardly extending hollow feeding tube 1070 via the top opening 1056 of cylindrical portion 1050 of the main body 1032 when the homogenizing insert 1490 properly mates with the main body 1032.

The rear cylindrical section 1494 includes two exterior notches 1507, 1508 disposed in a rim 1509 circumscribing front opening 1502 of the rear cylindrical section 1494. The two exterior notches 1107, 1108 correspond to and mate with the two interior diametrically opposed longitudinally extending ridges 1052, 1054 (FIG. 49) of the hollow cylindrical portion 1050.

Furthermore, the rear cylindrical section 1494 includes three interior spaced apart longitudinally extending ribs 1510, 1511, and 1512 (FIG. 76) which interiorly extend between the rear opening 1498 and the front discharge opening 1530.

Moreover, the rear cylindrical section 1494 also includes three interior spaced apart longitudinally extending abbreviated ribs 1513, 1515, and 1517 which interiorly extend proximate opening 1504 and the front discharge opening 1530.

Front Conical Section 1514

Referring to FIG. 74, the insert member 1492 is further comprised of the front conical section 1514 defined by a plurality of spaced apart ribs 1516 having rear and front ends. In one embodiment, there are six spaced apart ribs 1516 with each of the three lower ribs respectively forming part of the longitudinally extending ribs 1510, 1511, and 1512 that are disposed within the interior of the conical section 1514 and with each of the three upper ribs respectively forming part of the longitudinally extending abbreviated ribs 1513, 1515, and 1517 disposed within an interior of the conical section 1514.

At their front ends, the plurality of spaced apart ribs 1516 transition into an annular collar 1520 that radially outwardly extends from the front ends of the plurality of spaced apart ribs 1516. The annular collar 1520 forwardly steps down and transitions into a hollow annular rim 1522 which terminates to a front circular edge 1524 defining the open outer end or the discharge opening 1530 for the expulsion of homogenized food material.

Two spaced apart L-shaped protrusions 1527, 1528 disposed on an exterior surface of the annular rim 1522 form two spaced apart L-shaped notches 1531, 1532 that receive two complementarily shaped tabs 1252, 1254 (FIG. 64) disposed on an interior surface of a restrictor coupling 1230.

Open Ended Closed Sided Cone Member 1534

The open ended closed sided cone member 1534 is formed with or fitted into the front conical section 1514 of homogenizing insert member 1492. Additionally, the rear cylindrical section 1494 and the front conical section 1514 can be manufactured by molding the two sections separately or in combination with one another. Thus, the homogenizing insert 1490 can be manufactured in multiple pieces coupled to each other or as a single, unitary piece.

Use and Operation of Homogenizing Configuration 1430

The use and operation of juicer 1010 in the homogenizing configuration 1430 is similar to the use and operation of the greens juicing configuration 1030 with the exception of using the grinding cutter 1340 in place of the greens cutter 1140 and using the homogenizing insert 1490 in place of the screen insert 1090.

Hence, the user first assembles the components shown in FIG. 73 to the motor shaft 24 and hub 1020 shown in FIG. 45 in a similar fashion described hereinabove for the greens juicing configuration 1030.

Once assembled, a speed is selected via user speed selection module 290 and the juicer 1010 is turned on via manual on/off switch 272.

Typically, and in one embodiment, a high speed is selected for the homogenizing configuration 1430.

Next, food is placed into the feeding tube 1070 via feed tube opening 1074 and tamper 1075 is employed to assist in forcing the food to the grinding cutter 1340 by pulsing or moving the tamper 1075 up and down. The food passes through opening 1504 in homogenizing insert 1490 and makes contact with cutting portion 1344 of grinding cutter 1340 wherein the food is cut and pushed forward to spiral auger portion 1350. The cut food is squeezed or compressed between ribs 1510, 1511, 1512, 1513, 1515, and 1517 of the homogenizing insert 1490 and the grinding cutter 1340 to process the cut food into a uniform mixture. The uniform mixture or homogenized food is forced forward through the central front discharge opening 1268 of restrictor coupling 1230 for a restricted discharge of the uniform mixture or homogenized food which is downwardly deflected by deflector 1280 into, for example, a container below.

Disassembly of the homogenizing configuration 1430 can be accomplished by reversing the assembly steps.

Shredder Configuration

The shredder configuration of the juicer 1010 is preferably utilized for shredding hard or soft vegetables such as for salads, coleslaw, and cakes or muffins, such that no juice is produced. The shredder configuration comprises greens auger or cutter 1140, homogenizing or closed window insert 1490, main body 1032, a shredder coupling 1730 in place of the restrictor coupling 1230, and optional deflector 1280. Alternatively, instead of greens cutter 1140, grinding cutter 1340 may be used to achieve a more finely ground material.

Greens auger or cutter 1140, grinding cutter 1340, homogenizing insert 1490, main body 1032, and optional deflector 1280 are as delineated in detail hereinabove.

Accordingly, the single remaining component of the shredder configuration of the juicer 1010 that has not been delineated in detail hereinabove is the shredder coupling 1730 which will now be delineated in detail hereinbelow.

Shredder Coupling 1730

In one embodiment, the shredder coupling 1730 generally follows the structure of the above delineated restrictor coupling 1230 without the hollow cylindrical central portion 1262.

Figure 77:
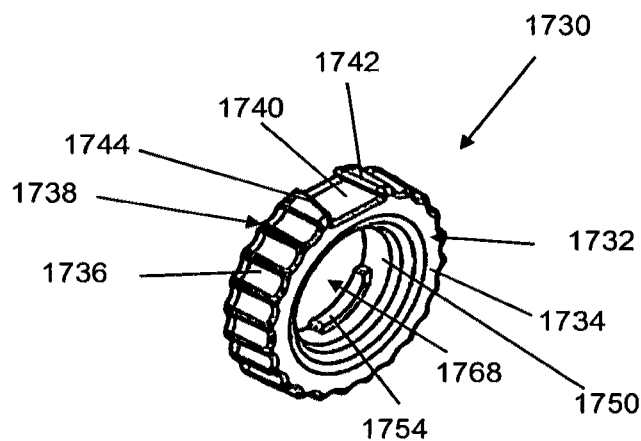
FIG. 77 is a side and front perspective view of a shredder coupling.
Figure 78:
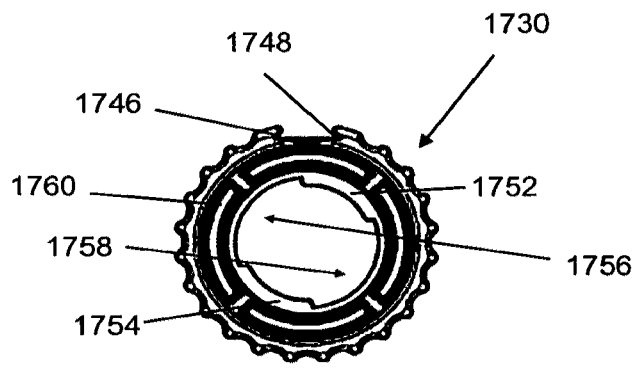
FIG. 78 is a rear elevational view of the shredder restrictor coupling.

In particular, and referring to FIGS. 77 and 78, the shredder coupling 1730 is comprised of a short cylindrically shaped body 1732 comprising a generally flat front face 1734 having an outer periphery that transitions into a rearwardly extending annularly shaped outer sidewall 1736 having a circumscribing ribbed portion 1738. Additionally, the annularly shaped outer sidewall 1736 includes a notched section 1740 having upwardly and inwardly extending sidewalls 1742, 1744 forming a pair of spaced apart interior sidewall grooves 1746, 1748 above the notched section 1740.

Furthermore, the cylindrically shaped body 1732 is comprised of an inner circumscribing annular flange portion 1750 that defines a central discharge opening 1768. The inner circumscribing annular flange portion 1750 rearwardly extends from the flat front face 1734 of the body 1732 and is radially inwardly spaced from and circumscribed by the annularly shaped outer sidewall 1736 wherein a first circular channel 1760 is formed between the annularly shaped outer sidewall 1736 and the inner annular flange portion 1750 for receipt of circumscribing flange 1064 of body 1032 in the shredder assembled configuration. The inner annular flange portion 1750 comprises a pair of diametrically opposed and arcuate shaped tabs 1752, 1754 that radially inwardly extend from an inner and upper peripheral edge of the inner annular flange portion 1750 thereby forming a pair of diametrically opposed and arcuate shaped notches 1756, 1758.

Moreover, shredder coupling 1730 is operatively coupled to the homogenizing or closed window insert 1490 by simply aligning and pushing the respective tabs 1752, 1754 into the two spaced apart base branch notches of the L-shaped notches 1531, 1532 of the closed window insert 1490 and twisting the shredder coupling 1730 counterclockwise. This twisting motion locates the pair of diametrically opposed and arcuate shaped tabs 1752, 1754 of the shredder coupling 1730 into the two spaced apart branch notches of the L-shaped notches 1531, 1532 of the closed window insert 1490 which are perpendicular to the base branch notches noted above thereby respectively locating the arcuate shaped tabs 1752, 1754 behind the perpendicular branches of the two spaced apart and horizontally flipped L-shaped protrusions 1527, 1528 of the closed window insert 1490.

Use and Operation of Shredder Configuration

The use and operation of juicer 1010 in the shredder configuration is similar to the use and operation of the greens juicing configuration 1030 with the exception of using homogenizing or closed window insert 1490 in place of the screen insert 1090, and using the shredder coupling 1730 in place of the restrictor coupling 1230.

Hence, the user first assembles the components in an analogous manner as was delineated above for the greens juicing configuration 1030 with the exception of using homogenizing or closed window insert 1490 in place of the screen insert 1090, and using the shredder coupling 1730 in place of the restrictor coupling 1230. A container is placed below deflector 1280 to collect the solid material.

Once assembled, a speed is selected via user speed selection module 290 and the juicer 10 is turned on via manual on/off switch 272. Typically, and in one embodiment, a medium or high speed is selected for the shredder configuration. Next, food is placed into the feeding tube 1070 via feed tube opening 1074 and tamper 1075 is employed to assist in forcing the food to the greens cutter 1140 by pulsing or moving the tamper 1075 up and down. The food passes through opening 1504 in shredder or closed window insert 1490 and makes contact with the grabbing and auguring section 1224 comprising the feed region 1172 of the greens auger or cutter 1140 and the dimples 1180, 1190 respectively disposed on the front or leading sides of ribs 1150, 1160. The dimples 1180, 1190 promote the grabbing of the food while the rotating ribs 1150, 1160 also function both as a cutter and an auger for cutting the food and pushing it forward along the length of both the grabbing and auguring section 1224 and the medial auguring section 1226 to the front spiral auger nose section 1228. The coaction of the ribs 1510, 1511, 1512, 1513, 1515, and 1517 of the shredder or closed window insert 1490 and greens auger or cutter 1140 promotes the shredding process. The shredded food is forced forward through the central discharge opening 1768 of the shredder coupling 1700 where it is downwardly deflected by deflector 1280 into the container below.

Disassembly of the shredder configuration can be accomplished by reversing the assembly steps.

In one aspect, the above delineated greens juicing configurations, vegetable juicing configurations, homogenizing configurations, and shredder configurations of the juicer 10 and the juicer 1010 are interchangeable by replacing the configuration of hub 20 with the configuration of hub 1020 and the configuration of flange 40 with the configuration of flange 1040 or vice versa.

In another aspect, the components of the juicer 10 and 1010 can be made of nylon for light use, stainless steel for heavy use, or a combination of nylon and stainless steel.

Accordingly, it should be apparent that further numerous structural modifications and adaptations may be resorted to without departing from the scope and fair meaning of the present invention as set forth hereinabove and as described herein below by the claims.

I claim:

1. A power juicer, comprising:
   a housing;
   a motor disposed within said housing and having an output shaft projecting away from said housing;
   an auger detachably connectable to said output shaft;
   said auger having a body including a first helical rib and a second helical rib monolithically formed therewith and arranged around said body with phases of said first and second helical ribs equidistantly shifted from each other about said body of said auger;
   an insert circumscribing said auger wherein said auger fits within a passageway of said insert bounded by a rear circumscribing sidewall having a sidewall feed opening extending therethrough and by a perforated front circumscribing sidewall terminating to a front circumscribing flange defining a front discharge opening of said insert;
   a body circumscribing said insert and detachably connectable to said housing, said body having a feeding throat in open communication with said sidewall feed opening, a front opening circumscribing said front discharge opening of said insert, and a juice outlet in open communication with said perforated front circumscribing sidewall of said insert; and
   a plurality of spaced apart dimples defined by a plurality of spaced apart concave surfaces disposed on a front side of said first helical rib at a location in registry with said sidewall feed opening of said insert and said feeding throat of said body for promoting a grabbing action by said auger of food feed through said feeding throat of said body and said sidewall feed opening of said insert.

2. The power juicer of claim 1 wherein said first helical rib starts from a rear end of said body and said second helical rib starts after one and one-quarter revolutions of said start of said first helical rib for defining a feed region of said auger that is devoid of one and one-quarter revolutions of said second helical rib at a location in registry with said sidewall feed opening of said insert and said feeding throat of said body.

3. The power juicer of claim 1 wherein said second helical rib comprises a plurality of spaced apart dimples defined by a plurality of spaced apart concave surfaces disposed on a front side of said second helical rib at a location within a half revolution from were said second helical rib starts for promoting a grabbing action by said auger of food feed through said feeding throat of said body and said sidewall feed opening of said insert.

4. The power juicer of claim 1 wherein said first helical rib and said second helical rib are arranged with said phases equidistantly shifted one-hundred eighty degrees from each other about said body of said auger.

5. The power juicer of claim 1 wherein said rear circumscribing sidewall of said insert comprises a rear interior surface, said perforated front circumscribing sidewall of said insert comprises a front interior surface, and said insert comprises a plurality of spaced apart longitudinally extending ribs disposed on said rear and front interior surfaces for coacting with said first and second helical ribs equidistantly shifted from each other about said body of said auger for cutting and compressing said food feed through said feeding throat of said body and said sidewall feed opening of said insert for extracting juice therefrom wherein the extracted juice flows out of said perforated front circumscribing sidewall and out through said juice outlet of said body.

6. The power juicer of claim 5 further comprising a restrictor coupling detachably coupled to said front circumscribing flange of said insert defining said front discharge opening of said insert, said restrictor coupling having a restricted discharge opening with an open area less than an open area of said front discharge opening of said insert for restricting discharge of said cut and compressed food through said front discharge opening of said insert.

7. The power juicer of claim 6 wherein said restrictor coupling further comprises a cylindrical portion having a hollow interior bounded by an inner conically shaped surface tapering from a rear opening of said cylindrical portion to an inner opening defining said restricted discharge opening of said restrictor coupling, said inner conically shaped surface comprising a plurality of longitudinally extending ribs monolithically formed therewith for interacting with a plurality of helical ribs monolithically formed on a tapered nose extending from a front end of said body of said auger for further compressing and juicing said cut and compressed food prior to being passed through said front discharge opening of said insert and restricted by said restricted discharge opening of said restrictor coupling.

8. The power juicer of claim 7 further comprising a deflector detachably connectable to said restrictor coupling for acting as a shield and guiding juiced cut food downward.

9. The power juicer of claim 8 further comprising a tamper sized to be received in said feeding throat of said body for assisting in feeding food therethrough.

10. A power juicer greens attachment removably connectable to a housing enclosing a motor having an output shaft disposed within the housing with an end of the output shaft projecting from the housing, said greens attachment comprising:
an auger detachably connectable to the output shaft;
said auger having a body including a first helical rib and a second helical rib monolithically formed therewith and arranged around said body with phases of said first and second helical ribs equidistantly shifted from each other about said body of said auger;
an insert circumscribing said auger wherein said auger fits within a passageway of said insert bounded by a rear circumscribing sidewall having a sidewall feed opening extending therethrough and by a perforated front circumscribing sidewall terminating to a front circumscribing flange defining a front discharge opening of said insert;
a body circumscribing said insert and detachably connectable to the housing, said body having a feeding throat in open communication with said sidewall feed opening, a front opening circumscribing said front discharge opening of said insert, and a juice outlet in open communication with said perforated front circumscribing sidewall of said insert; and
a plurality of spaced apart dimples defined by a plurality of spaced apart concave surfaces disposed on a front side of said first helical rib at a location in registry with said sidewall feed opening of said insert and said feeding throat of said body for promoting a grabbing action by said auger of food feed through said feeding throat of said body and said sidewall feed opening of said insert.

11. The greens attachment of claim 10 wherein said first helical rib starts from a rear end of said body and said second helical rib starts after one and one-quarter revolutions of said start of said first helical rib for defining a feed region of said auger that is devoid of one and one-quarter revolutions of said second helical rib at a location in registry with said sidewall feed opening of said insert and said feeding throat of said body.

12. The greens attachment of claim 10 wherein said second helical rib comprises a plurality of spaced apart dimples defined by a plurality of spaced apart concave surfaces disposed on a front side of said second helical rib at a location within a half revolution from were said second helical rib starts for promoting a grabbing action by said auger of food feed through said feeding throat of said body and said sidewall feed opening of said insert.

13. The greens attachment of claim 10 wherein said first helical rib and said second helical rib are arranged with said phases equidistantly shifted one-hundred eighty degrees from each other about said body of said auger.

14. The greens attachment of claim 10 wherein said rear circumscribing sidewall of said insert comprises a rear interior surface, said perforated front circumscribing sidewall of said insert comprises a front interior surface, and said insert comprises a plurality of spaced apart longitudinally extending ribs disposed on said rear and front interior surfaces for coacting with said first and second helical ribs equidistantly shifted from each other about said body of said auger for cutting and compressing said food feed through said feeding throat of said body and said sidewall feed opening of said insert for extracting juice therefrom wherein the extracted juice flows out of said perforated front circumscribing sidewall and out through said juice outlet of said body.

15. The greens attachment of claim 14 further comprising a restrictor coupling detachably coupled to said front circumscribing flange of said insert defining said front discharge opening of said insert, said restrictor coupling having a restricted discharge opening with an open area less than an open area of said front discharge opening of said insert for restricting discharge of said cut and compressed food through said front discharge opening of said insert.

16. The greens attachment of claim 15 wherein said restrictor coupling further comprises a cylindrical portion having a hollow interior bounded by an inner conically shaped surface tapering from a rear opening of said cylindrical portion to an inner opening defining said restricted discharge opening of said restrictor coupling, said inner conically shaped surface comprising a plurality of longitudinally extending ribs monolithically formed therewith for interacting with a plurality of helical ribs monolithically formed on a tapered nose extending from a front end of said body of said auger for further compressing and juicing said cut and compressed food prior to being passed through said front discharge opening of said insert and restricted by said restricted discharge opening of said restrictor coupling.

17. The greens attachment of claim 16 further comprising a deflector detachably connectable to said restrictor coupling for acting as a shield and guiding juiced cut food downward.

18. The greens attachment of claim 17 further comprising a tamper sized to be received in said feeding throat of said body for assisting in feeding food therethrough.

19. A power juicer, comprising:
a housing;
a motor substantially horizontally disposed within said housing and having an output shaft substantially horizontally projecting away from said housing;
at least two alternate cutters comprised of at least a greens cutter and a grinding cutter each individually detachably connectable to said output shaft;

wherein said greens cutter comprises:
- a body including a first helical rib and a second helical rib monolithically formed therewith and arranged around said body with phases of said first and second helical ribs equidistantly shifted from each other about said body of said cutter; and
- a plurality of spaced apart dimples defined by a plurality of spaced apart concave surfaces disposed on a front side of said first helical rib for promoting a grabbing action by said greens cutter of food; and wherein said grinding cutter comprises:
- a longitudinally extending body comprising a cutting portion comprising a plurality of substantially parallel longitudinally extending saw toothed cutting blades circumferentially disposed around said body, an auger portion forwardly transitioning from said cutting portion and comprising two projecting helical ribs arranged around said body with phases of said two projecting helical ribs equidistantly shifted from each other about said body, and a front spiral auger nose portion forwardly transitioning from said auger portion; and means for actuating said motor for rotating a selected one of said at least two alternate cutters detachably connected to said output shaft at one of a plurality of different selectable speeds.

20. A juicer device, comprising:

a housing;

a motor substantially horizontally disposed within said housing and having an output shaft substantially horizontally projecting away from said housing;

at least two alternate cutters comprised of at least a greens cutter and a grinding cutter each individually detachably connectable to said output shaft;

a plurality of alternate inserts each having a top opening and a passage extending therethrough, said passage having an open back end and an open front end wherein a selected one of said plurality of alternate inserts circumscribes a selected one of said at least two alternate cutters detachably connected to said output shaft by said passage being shaped to receive said selected one of said at least two alternate cutters within said selected one of said plurality of alternate inserts through said open back end of said passage; and a body operatively coupled to said housing and having an hollow extending therethrough and a feeding throat in open communication with said hollow, said hollow having an entrance end and an exit end wherein said selected one of said plurality of alternate inserts and said body concentrically circumscribe said selected one of said at least two alternate cutters detachably connected to said output shaft by said hollow being shaped to receive said selected one of said plurality of alternate inserts within said body through said entrance end of said hollow so that said top opening of said selected one of said plurality of alternate inserts is in open communication with said feeding throat; and wherein said greens cutter comprises:
- a body including a first helical rib and a second helical rib monolithically formed therewith and arranged around said body with phases of said first and second helical ribs equidistantly shifted from each other about said body of said cutter;
- a plurality of spaced apart dimples defined by a plurality of spaced apart concave surfaces disposed on a front side of said first helical rib at a location in registry with said top opening of said selected one of said plurality of alternate inserts and said feeding throat of said body for promoting a grabbing action by said greens cutter of food feed through said feeding throat of said body and said top opening of said selected one of said plurality of alternate inserts; and wherein said grinding cutter comprises:
- a longitudinally extending body comprising a cutting portion having a plurality of substantially parallel longitudinally extending saw toothed cutting blades circumferentially disposed around said body, an auger portion forwardly transitioning from said cutting portion and comprising two projecting helical ribs arranged around said body with phases of said two projecting helical ribs equidistantly shifted from each other about said body, and a front spiral auger nose portion forwardly transitioning from said auger portion.

* * * * *